(12) United States Patent
Kim et al.

(10) Patent No.: US 11,558,795 B2
(45) Date of Patent: Jan. 17, 2023

(54) METHOD AND APPARATUS FOR CONTROLLING PACKET DUPLICATION BY CONSIDERING DUAL CONNECTIVITY IN NEXT-GENERATION MOBILE COMMUNICATION SYSTEM

(71) Applicant: Samsung Electronics Co., Ltd., Suwon-si (KR)

(72) Inventors: Sangbum Kim, Suwon-si (KR); Sangkyu Baek, Suwon-si (KR); Soenghun Kim, Suwon-si (KR); Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 16/447,413

(22) Filed: Jun. 20, 2019

(65) Prior Publication Data
US 2019/0394693 A1    Dec. 26, 2019

(30) Foreign Application Priority Data

Jun. 20, 2018  (KR) .................. 10-2018-0071059

(51) Int. Cl.
*H04W 36/04*   (2009.01)
*H04W 36/00*   (2009.01)
(Continued)

(52) U.S. Cl.
CPC ....... *H04W 36/04* (2013.01); *H04W 36/0058* (2018.08); *H04W 36/0061* (2013.01);
(Continued)

(58) Field of Classification Search
CPC ......... H04W 36/0058; H04W 36/0061; H04W 36/04; H04W 36/06; H04W 80/02;
(Continued)

(56) References Cited

U.S. PATENT DOCUMENTS

| 2012/0322447 A1 | 12/2012 | Ramachandran et al. |
| 2015/0304918 A1 | 10/2015 | Jung et al. |

(Continued)

FOREIGN PATENT DOCUMENTS

RU    2 611 015 C2    2/2017

OTHER PUBLICATIONS

ETSI MCC, 'Report of 3GPP TSG RAN2#101bis meeting, Sanya, China', R2-1806601, 3GPP TSG-RAN WG2 #102, Busan, Korea, May 20, 2018 See pp. 238-239.

(Continued)

*Primary Examiner* — Derrick V Rose
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. An embodiment relates to packet duplication control. Further, an embodiment relates to cell reselection. A communication method, a terminal, and a base station are provided. The method includes receiving system information related to cell reselection of a neighboring cell, from a base station on which the terminal is camping, in case that the terminal supports a supplementary uplink (SUL) and the system information includes first minimum requirement reception level information related to the SUL, acquiring a first cell selection reception level value based on the first minimum requirement reception level information related to (Continued)

the SUL and performing cell reselection to a new radio (NR) cell based on the first cell selection reception level value.

16 Claims, 24 Drawing Sheets

(51) Int. Cl.
  *H04W 36/06* (2009.01)
  *H04W 88/06* (2009.01)
  *H04W 88/10* (2009.01)
  *H04W 80/02* (2009.01)
(52) U.S. Cl.
  CPC ........... *H04W 36/06* (2013.01); *H04W 80/02* (2013.01); *H04W 88/06* (2013.01); *H04W 88/10* (2013.01)
(58) Field of Classification Search
  CPC ..... H04W 88/06; H04W 88/10; H04W 24/08; H04W 28/0252; H04W 36/0005; H04W 48/12; H04W 48/18; H04W 48/20; H04W 76/27
  See application file for complete search history.

(56) References Cited

U.S. PATENT DOCUMENTS

| | | | |
|---|---|---|---|
| 2017/0118701 A1 | 4/2017 | Kim et al. | |
| 2017/0311290 A1* | 10/2017 | Adjakple | .............. H04W 76/18 |
| 2017/0318478 A1* | 11/2017 | Basu Mallick | ....... H04L 5/0091 |
| 2018/0049087 A1* | 2/2018 | Lee | ........................ H04W 24/08 |
| 2019/0222367 A1* | 7/2019 | Tseng | ...................... H04L 5/001 |
| 2020/0120521 A1* | 4/2020 | da Silva | ................ H04W 24/08 |
| 2020/0280899 A1* | 9/2020 | Zhang | ................... H04W 36/00 |

OTHER PUBLICATIONS

Huawei et al., '[101bis#13][NR] Text Proposal on the ASN.1 for SIB content.', R2-1808190, 3GPP TSG-RAN WG2 #102, Busan, Korea, May 11, 2018 See pp. 4-7.

Huawei et al., 'Cell Reselection for SUL Cell', R2-1808205, 3GPP TSG-RAN WG2 #102, Busan, Korea, May 11, 2018 See sections 2-3.

International Search Report dated Sep. 30, 2019, issued in International Patent Application No. PCT/KR2019/007451.

Huawei et al: "Text Proposal on the ASN.1 for SIB content", 3GPP Draft; R2-1809108, Revision of R2-1808190 [101BIS#13][NR] Text Proposal on the ASN.1 for SIB Content, 3rd Generation Partnership Project (3GPP), Mobile Competence Centre ; 650, Route Des Lucioles, vol. RAN WG2, No. Busan, Korea; May 21, 2018-May 25, 2018 May 25, 2018 (May 25, 2018), XP051520435.

European Search Report dated Jun. 25, 2021, issued in European Application No. 19822158.2.

CMCC, Open issues on cell selection / reselection rules, 3GPP TSG-RAN WG2 Meeting # 101bis (R2-1805508) Sanya, China, Apr. 16-20, 2018.

Russian Office Action dated Nov. 10, 2021, issued in Russian Application No. 2020141708.

* cited by examiner (a)

(b)

METHOD AND APPARATUS FOR CONTROLLING PACKET DUPLICATION BY CONSIDERING DUAL CONNECTIVITY IN NEXT-GENERATION MOBILE COMMUNICATION SYSTEM

CROSS-REFERENCE TO RELATED APPLICATION(S)

This application is based on and claims priority under 35 U.S.C. 119(a) of a Korean patent application number 10-2018-0071059, filed on Jun. 20, 2018, in the Korean Intellectual Property Office, the disclosure of which is incorporated by reference herein in its entirety.

BACKGROUND

1. Field

The disclosure relates to packet duplication control considering a dual connectivity architecture in a mobile communication system. More particularly, the disclosure relates to cell reselection in a mobile communication system.

2. Description of Related Art

To meet the demand for wireless data traffic having increased since deployment of 4G communication systems, efforts have been made to develop an improved 5$^{th}$ Generation (5G) or pre-5G communication system. Therefore, the 5G or pre-5G communication system is also called a 'Beyond 4$^{th}$ Generation (4G) Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation frequency and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for controlling packet duplication by considering a dual connectivity architecture, and an apparatus for performing the same.

Another aspect of the disclosure is to provide a cell reselection method and an apparatus for performing the same.

Additional aspects will be set forth in part in the description which follows and, in part, will be apparent from the description, or may be learned by practice of the presented embodiments.

In accordance with an aspect of the disclosure, a method of a terminal is provided. The method includes receiving system information related to cell reselection of a neighboring cell, from a base station on which the terminal is camping, in case that the terminal supports a supplementary uplink (SUL) and the system information includes first minimum requirement reception level information related to the SUL, acquiring a first cell selection reception level value based on the first minimum requirement reception level information related to the SUL and, performing cell reselection to a new radio (NR) cell based on the first cell selection reception level value.

In accordance with another aspect of the disclosure, a terminal of a communication system is provided. The terminal includes a transceiver and a controller coupled with the transceiver. The controller is configured to receive system information related to cell reselection of a neighboring cell, from a base station on which the terminal is camping, in case that the terminal supports a supplementary uplink (SUL) and the system information includes first minimum requirement reception level information related to the SUL, to acquire a first cell selection reception level value based on the first minimum requirement reception level information related to the SUL, and to perform cell reselection to a new radio (NR) cell based on the first cell selection reception level value.

In accordance with another aspect of the disclosure, a method of a base station is provided. The method includes identifying a neighboring new radio (NR) cell supporting a supplementary uplink (SUL), generating system information related to a cell reselection to the neighboring NR cell supporting the SUL and transmitting the system information, wherein, in case that a terminal receives the system information and supports the SUL, a first cell selection reception level value is acquired based on first minimum requirement reception level information related to the SUL included in the system information, and wherein a cell reselection is performed based on the first cell selection reception level value.

In accordance with another aspect of the disclosure, a base station is provided. The base station includes a transceiver and a controller coupled with the transceiver. The controller is configured to identify a neighboring new radio (NR) cell supporting a supplementary uplink (SUL), to generate system information related to a cell reselection of the neighboring NR cell supporting the SUL, and to transmit the system information, wherein, in case that a terminal receives the system information and supports the SUL, a first cell selection reception level value is acquired based on first minimum requirement reception level information related to the SUL included in the system information, and wherein a cell reselection is performed based on the first cell selection reception level value.

The technical problems which are to be solved in embodiments are not limited to the above-mentioned technical problems, and other technical problems which are not mentioned will be clearly understood through the following descriptions by those having common knowledge in the technical field to which the disclosure pertains.

Embodiments may provide a method for controlling packet duplication by considering a dual connectivity architecture, and an apparatus for performing the same.

Further, embodiments may provide a cell reselection method considering an uplink and an apparatus for performing the same.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
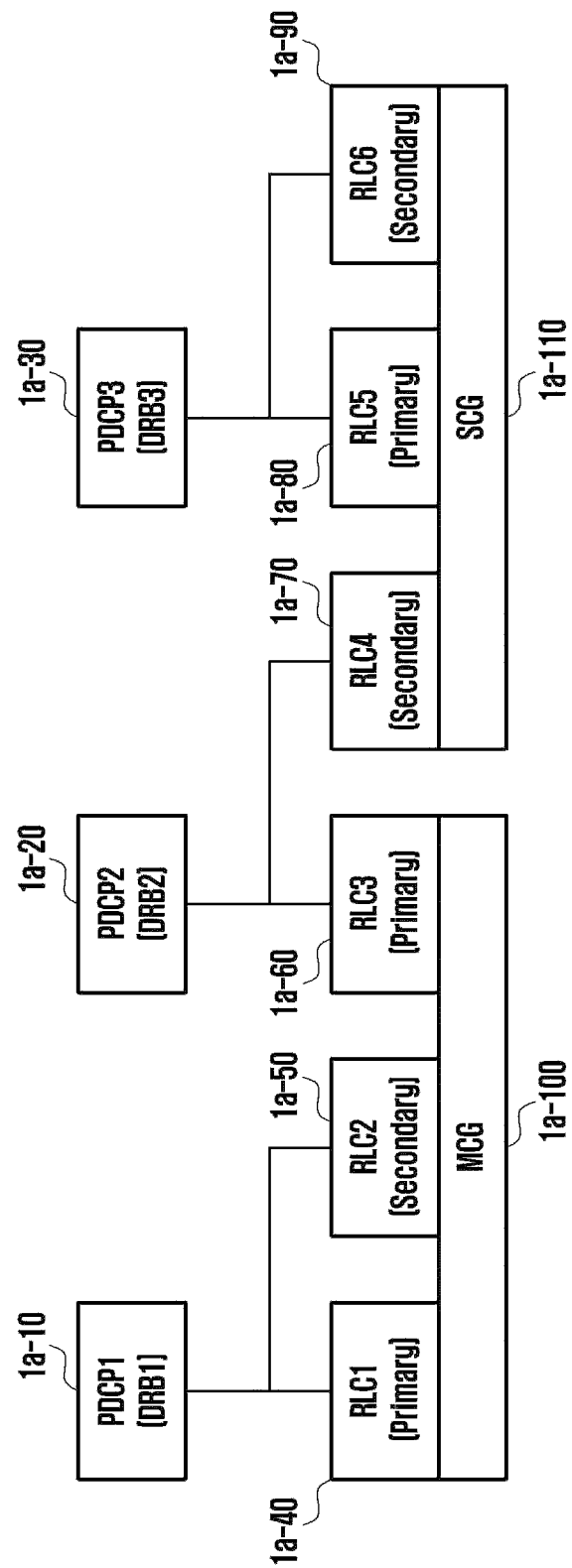
FIG. 1A is a block diagram illustrating a structure of a data radio bearer, for which packet duplication transmission is configured, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments in this specification, a description of technical contents, which are well-known in the technical field to which the disclosure pertains and are not directly associated with the disclosure, will be omitted. Such an omission of unnecessary descriptions is intended to prevent obscuring the subject matter of the disclosure and more clearly deliver the subject matter thereof.

For the same reason, some elements are exaggerated, omitted, or schematically illustrated in the accompanying drawings. Further, the size of each element does not entirely reflect its real size. In each drawing, the same or corresponding elements are denoted by the same reference numerals.

The advantages and features of the disclosure and methods of accomplishing the same will be apparent by making reference to the embodiments described in detail below with reference to the accompanying drawings. However, the disclosure is not limited to the embodiments disclosed herein but may be implemented in various different forms. The following embodiments are provided only for completeness of the disclosure and completely informing those skilled in the art of the scope of the disclosure, and the disclosure is defined only by the scope of the appended claims. Throughout the specification, the same or like reference numerals designate the same or like elements.

Here, it may be understood that each block of processing flowcharts and combinations of the flowcharts may be performed by computer program instructions. Since these computer program instructions may be loaded into processors for a general computer, a special-purpose computer, or other programmable data-processing apparatuses, these instructions executed by the processors for the computer or the other programmable data-processing apparatuses create means for performing functions described in block(s) of the flowcharts. Since these computer program instructions may also be stored in a computer-usable or computer-readable memory of a computer or other programmable data-processing apparatuses in order to implement the functions in a specific scheme, the computer program instructions stored in the computer-usable or computer-readable memory may also produce manufacturing articles including instruction means performing the functions described in block(s) of the flowcharts. Since the computer program instructions may also be loaded into a computer or other programmable data-processing apparatuses, the instructions may cause a series of operation steps to be performed on the computer or other programmable data-processing apparatuses so as to generate processes executable by the computer and enable an operation of the computer or other programmable data-processing apparatuses, and may also provide steps for implementing the functions described in the flowchart block(s).

Also, each block may indicate some of modules, segments, or codes including one or more executable instructions for executing a specific logical function(s). Further, it is to be noted that the functions mentioned in the blocks may occur out of order in some alternative embodiments. For example, two blocks that are consecutively illustrated may be performed substantially concurrently or may sometimes be performed in the reverse order, according to corresponding functions.

Here, the term "~unit" used in the embodiment means software or hardware elements such as a field-programmable gate array (FPGA) and an application-specific integrated circuit (ASIC), and the "~unit" may perform any roles. However, the meaning of "~unit" is not limited to software or hardware. The "~unit" may be configured to reside in a storage medium that may be addressed, and may also be configured to reproduce one or more processors. Accordingly, for example, the "~unit" includes: elements such as software elements, object-oriented software elements, class elements, and task elements; and processors, functions, attributes, procedures, subroutines, segments of program code, drivers, firmware, microcode, circuits, data, databases, data structures, tables, arrays, and variables. The functions provided in the elements and "~units" may be combined with a smaller number of elements and "-units" or may be further separated into additional elements and "~units." In addition, the elements and the "~units" may also be implemented to reproduce one or more central processing units (CPUs) within a device or a security multimedia card.

First Embodiment

FIG. 1A is a block diagram illustrating a structure of a data radio bearer (DRB), for which packet duplication transmission is configured, according to an embodiment of the disclosure.

Referring to FIG. 1A, it is assumed that three DRBs, that is, DRB1 1a-10, DRB2 1a-20, and DRB3 1a-30, are configured, and each DRB corresponds to one packet data convergence protocol (PDCP) apparatus. Packet duplication is performed by duplicating one packet in a PDCP layer of a transmitter and delivering the same to each of different radio link control (RLC) apparatuses. To this end, a DRB, for which packet duplication is configured, needs at least two RLC apparatuses corresponding to one PDCP. In the embodiment of FIG. 1A, a PDCP1 1a-10 is connected to an RLC1 1a-40 and an RLC2 1a-50, a PDCP2 1a-20 is connected to an RLC3 1a-60 and an RLC4 1a-70, and a PDCP3 1a-30 is connected to an RLC5 1a-80 and an RLC6 1a-90. RLC apparatuses connected to one PDCP apparatus may be classified into: the primary RLC apparatuses 1a-40, 1a-60, and 1a-80; and the secondary RLC apparatuses 1a-50, 1a-70, and 1a-90. The primary RLC apparatuses 1a-40, 1a-60, and 1a-80 are RLC apparatuses configured to perform packet delivery in a PDCP layer of a transmitter regardless of whether packet duplication is activated, and the secondary RLC apparatuses 1a-50, 1a-70, and 1a-90 are configured to perform packet delivery in a PDCP layer of a transmitter only if packet duplication is activated. In the embodiment of FIG. 1A, it is assumed that a primary RLC of the DRB1 1a-10 is the RLC1 1a-40, a primary RLC of the DRB2 1a-20 is the RLC2 1a-60, and a primary RLC of the DRB3 1a-30 is the RLC3 1a-80.

In a dual connectivity or multi-connectivity architecture in which, for such packet duplication transmission, a terminal is connected to two base stations, a data radio bearer for which packet duplication is configured may also be configured. In this example, connections with respective base stations may be classified into cell groups (CGs). The embodiment of FIG. 1A assumes a dual connectivity architecture, and implements a configuration of a master cell group (MCG) 1a-100, which assumes (SCG) 1a-110 which assumes connectivity with a secondary base station. In the embodiment of FIG. 1A, all the RLC apparatuses 1a-40 and 1a-50 connected to the DRB1 1a-10 are connected to the MCG 1a-100, and this configuration implies that packet duplication transmission performed by the DRB1 1a-10 is performed on the MCG 1a-100. In this example, a list of cells which can be used by each RLC apparatus may be predesignated, and each RLC apparatus performs data transmission only on a cell designated in the list. Since, among the RLC apparatuses connected to the DRB2 1a-20, the RLC3 1a-60 is connected to the MCG 1a-100 and the RLC4 1a-70 is connected to the SCG 1a-110, this configuration implies that packet duplication transmission performed by the DRB2 1a-20 is performed on both the MCG 1a-100 and the SCG 1a-110. Since all the RLC apparatuses 1a-80 and 1a-90 connected to the DRB3 1a-30 are connected to the SCG 1a-110, this configuration implies that packet duplication transmission performed by the DRB3 1a-30 is performed on the SCG 1a-110. In this example, a list of cells which can be used by each RLC apparatus may be predesignated, and each RLC apparatus performs data transmission only on a cell designated in the list.

DRBs, for which packet duplication transmission is configured, may be classified into dual connectivity (DC)-type packet duplication (DC duplication) and carrier aggregation (CA)-type packet duplication (CA duplication). The DC-type packet duplication assumes that packet transmission is performed on a bearer in which respective RLC apparatuses are connected to different CGs as in the case of the DRB2 1a-20. The CA-type packet duplication assumes that, as in the case of the DRB1 1a-10 and the DRB3 1a-30, all RLC apparatuses are connected to an identical cell group and a list of cells, which can be used by each RLC apparatus, is predesignated.

Figure 1B:
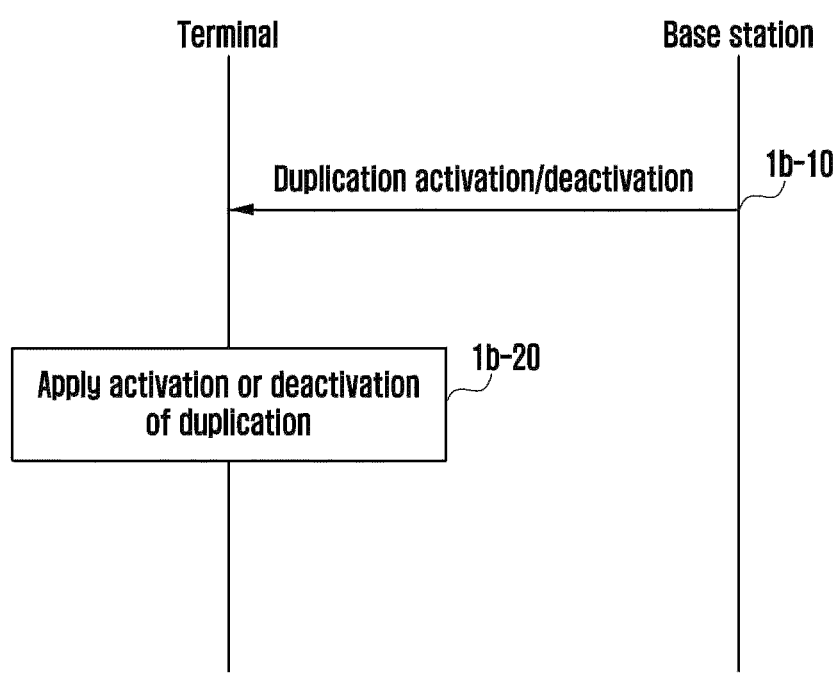
FIG. 1B illustrates a form, in which a base station controls activation or deactivation of packet duplication, according to an embodiment of the disclosure.

FIG. 1B illustrates a form, in which a base station controls activation or deactivation of packet duplication, according to an embodiment of the disclosure.

Referring to FIG. 1B, packet duplication transmission is configured to transmit an identical packet by using at least two RLC apparatuses, and thus increases the consumption of wireless resources. Since packet duplication transmission may cause inefficiency of utilization of radio resources, it is not good to always perform packet duplication. Therefore, packet duplication transmission may be performed only if the same is needed, and a configuration that allows a radio bearer, for which packet duplication is configured, to actually perform packet duplication is referred to as "activation of packet duplication." In contrast, a configuration that allows a radio bearer, for which packet duplication is configured, not to perform packet duplication is referred to as "deactivation of packet duplication."

In operation 1b-10, a base station may transmit a packet duplication activation/deactivation message to a terminal. In this example, an employed message may use a message in an identical form for activation or deactivation, and the included values may be used to distinguish activation of packet duplication from deactivation thereof. A packet duplication activation/deactivation message may indicate on which radio bearer packet duplication is activated or deactivated. In operation 1b-20, after the terminal receives the message, the terminal may apply activation or deactivation of packet duplication, according to an indication included in the message.

Figure 1C:
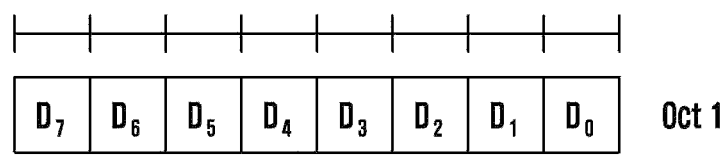
FIG. 1C illustrates a format of a packet duplication activation/deactivation message according to an embodiment of the disclosure.

FIG. 1C illustrates a format of a packet duplication activation/deactivation message according to an embodiment of the disclosure.

Referring to FIG. 1C, it is assumed that the message has a medium access control (MAC) control element (CE) format including one byte, that is, eight bitmaps. A bit of each of the eight bitmaps indicates activation or deactivation of packet duplication transmission on a particular radio bearer, and "1" may represent activation and "0" may represent deactivation. The eight bitmaps of FIG. 1C may indicate an activation or deactivation state of packet duplication on each of a maximum of eight radio bearers.

Embodiments propose which duplication activation/deactivation message is to be used to transmit an activation or deactivation state of a radio bearer. In this example, which radio bearer is to be indicated by each bitmap within a duplication activation/deactivation message implemented through application of one of the following configurations:

Bitmap indication in an ascending or descending order of identifiers (IDs) of DRBs among DRBs, for each of which packet duplication is configured and each of which includes an RLC apparatus connected to a cell group on which a corresponding MAC CE (a MAC CE for indicating duplication activation or deactivation on a radio bearer) is transmitted;

Bitmap indication in an ascending or descending order of IDs of DRBs among DRBs, for each of which packet duplication is configured and each of which includes a primary RLC apparatus connected to a cell group on which a corresponding MAC CE is transmitted;

Bitmap indication in an ascending or descending order of IDs of DRBs among DRBs, for each of which packet duplication is configured and each of which includes a secondary RLC apparatus connected to a cell group on which a corresponding MAC CE is transmitted;

Bitmap indication in an ascending or descending order of IDs of DRBs among DRBs, for each of which packet duplication is configured and each of which includes a PDCP anchor of a base station included in a base station node corresponding to a cell group on which a corresponding MAC CE is transmitted;

Bitmap indication in an ascending or descending order of IDs of DRBs among DRBs, for each of which packet duplication is configured and each of which includes an encryption key (a security key) of a base station node corresponding to a cell group on which a corresponding MAC CE is transmitted;

In relation to indication of activation or deactivation of packet duplication by using a corresponding MAC CE, bitmap indication in an ascending or descending order of IDs of DRBs among DRBs, for each of which packet duplication pre-configured by a base station is configured;

In the case of a MAC CE transmitted on an MCG, bitmap indication in an ascending or descending order of IDs of DRBs with respect to a DRB, for which CA-type packet duplication configured by the MCG is configured, and a DRB for which DC-type packet duplication configured by the MCG is configured. In the case of a MAC CE transmitted on an SCG, bitmap indication in an ascending or descending order of IDs of DRBs with respect to DRBs, for each of which CA-type packet duplication configured by the SCG is configured; or Base station designates a bitmap position of a particular MAC CE.

Figure 1D:
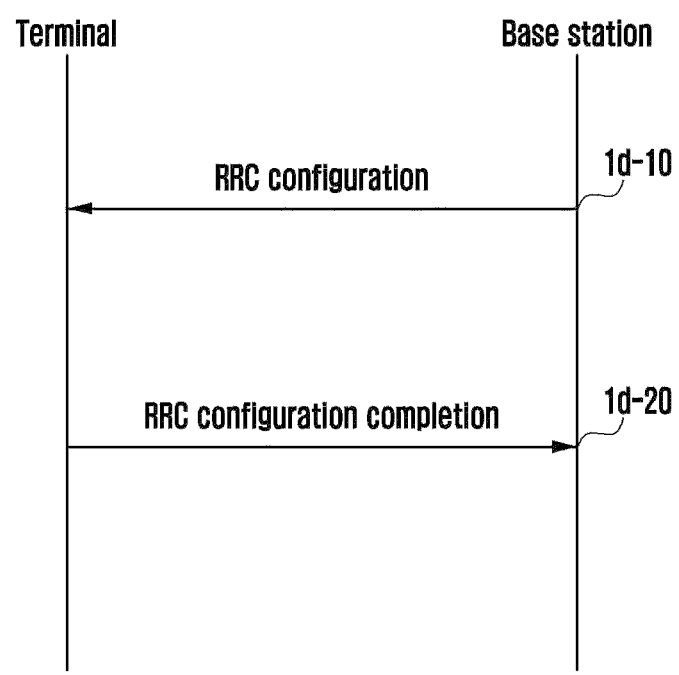
FIG. 1D is a signal flow diagram illustrating a method for configuring a data radio bearer configured for packet duplication according to an embodiment of the disclosure.

FIG. 1D is a signal flow diagram illustrating a procedure for configuring a DRB configured for packet duplication according to an embodiment of the disclosure.

Referring to FIG. 1D, in operation 1d-10, a base station transmits a radio resource control (RRC) configuration message to a terminal. The base station may generate or modify a radio bearer by using the RRC configuration message, and may configure packet duplication for the radio bearer. In this example, the base station may configure a DRB ID of each radio bearer and a logic channel ID corresponding to each RLC apparatus, and may configure a radio bearer including at least two RLC apparatuses for one PDCP apparatus illustrated in FIG. 1A, by corresponding these IDs. In this example, the base station may configure such that a primary RLC apparatus is distinguished from a secondary RLC apparatus among the RLC apparatuses. In operation 1d-20, the terminal may receive the configuration message, and after a configuration change of the terminal is completed, may transmit an RRC configuration completion message to the base station. The terminal may notify the base station that the configuration according to the configuration message has been completed, using the RRC configuration completion message.

Figure 1E:
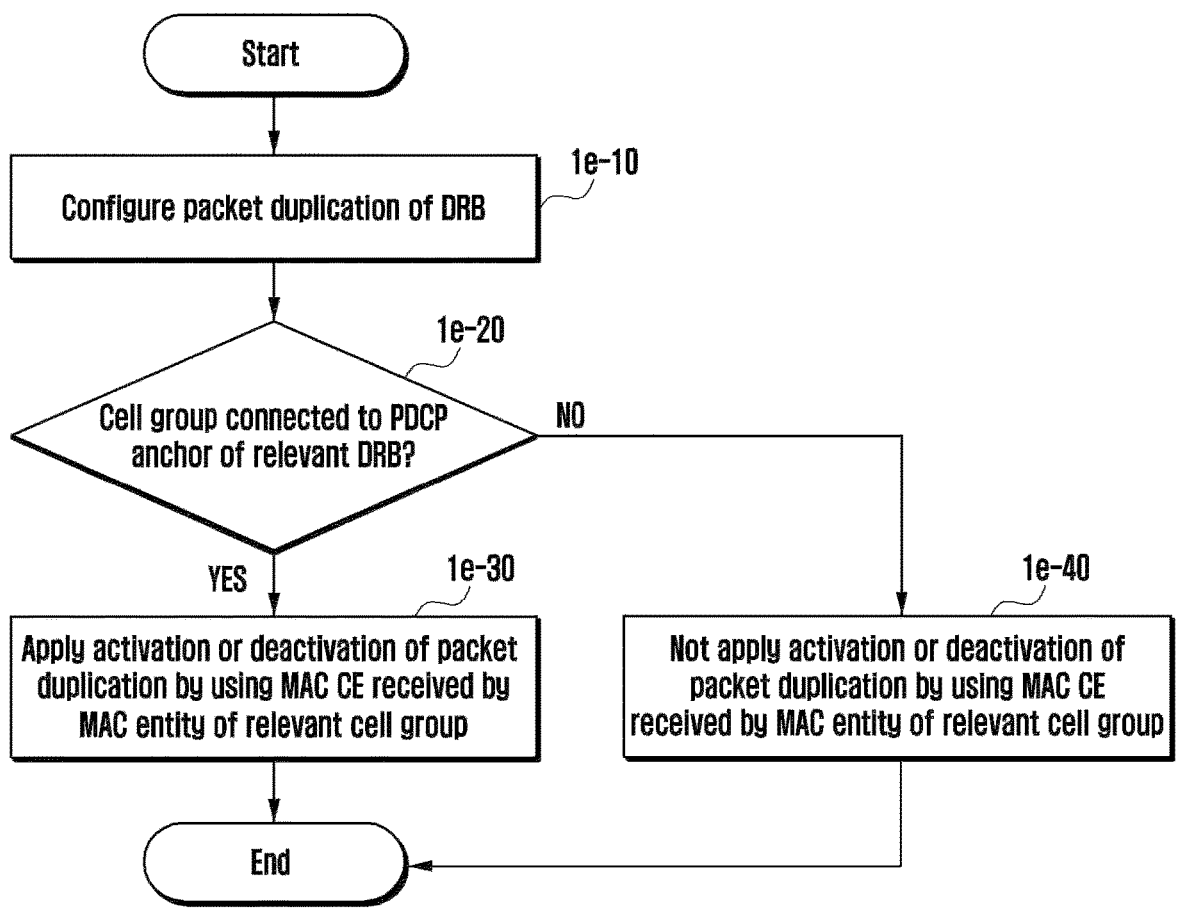
FIG. 1E is a flowchart illustrating a method for distinguishing between a message for applying an activation state or a deactivation state of a radio bearer and a message for not applying an activation state or a deactivation state of a radio bearer according to an embodiment of the disclosure.

FIG. 1E is a flowchart illustrating a method for distinguishing between a duplication activation/deactivation message for applying an activation state or a deactivation state of a radio bearer and a duplication activation/deactivation message for not applying an activation state or a deactivation state of a radio bearer according to an embodiment of the disclosure.

Referring to FIG. 1E, it may be assumed that a format of a packet duplication activation/deactivation message employs the MAC CE format described with reference to FIG. 1C, but the disclosure is not limited thereto. If packet duplication is configured for a DRB in operation 1e-10, then in operation 1e-20, a terminal may determine, for all CGs used by the terminal, whether a MAC CE, received on a particular cell group, is to be used to activate or deactivate packet duplication of a DRB of the cell group. In operation 1e-20, to which cell group a network node, at which a base station PDCP anchor of the DRB (for which determination of activation or deactivation of packet duplication is to be made) is located, is connected may become a determination criterion. If the base station PDCP anchor of the DRB is located at a network node connected to a first cell group, in operation 1e-30, the terminal may apply activation or deactivation of packet duplication of the DRB by using a MAC CE transmitted on the first cell group. If the base station PDCP anchor of the DRB is not located at the network node connected to the first cell group, in operation 1e-40, the terminal does not apply the activation or deactivation of the packet duplication of the relevant DRB by using the MAC CE transmitted on the first cell group. For example, if, for the DRB, a base station PDCP anchor is located at a master node, the terminal applies activation or deactivation of packet duplication of the DRB by using a MAC CE received on an MCG, and does not apply activation or deactivation of packet duplication of the DRB by using an MAC CE received on an SCG. However, although a MAC CE is not used to apply activation or deactivation of packet duplication to the DRB, a bitmap may correspond to the DRB in the MAC CE. Even if any bitmap of a MAC CE corresponds to the DRB, when the relevant MAC CE is not used to apply activation or deactivation of packet duplication, the terminal may ignore the bitmap.

Figure 1F:
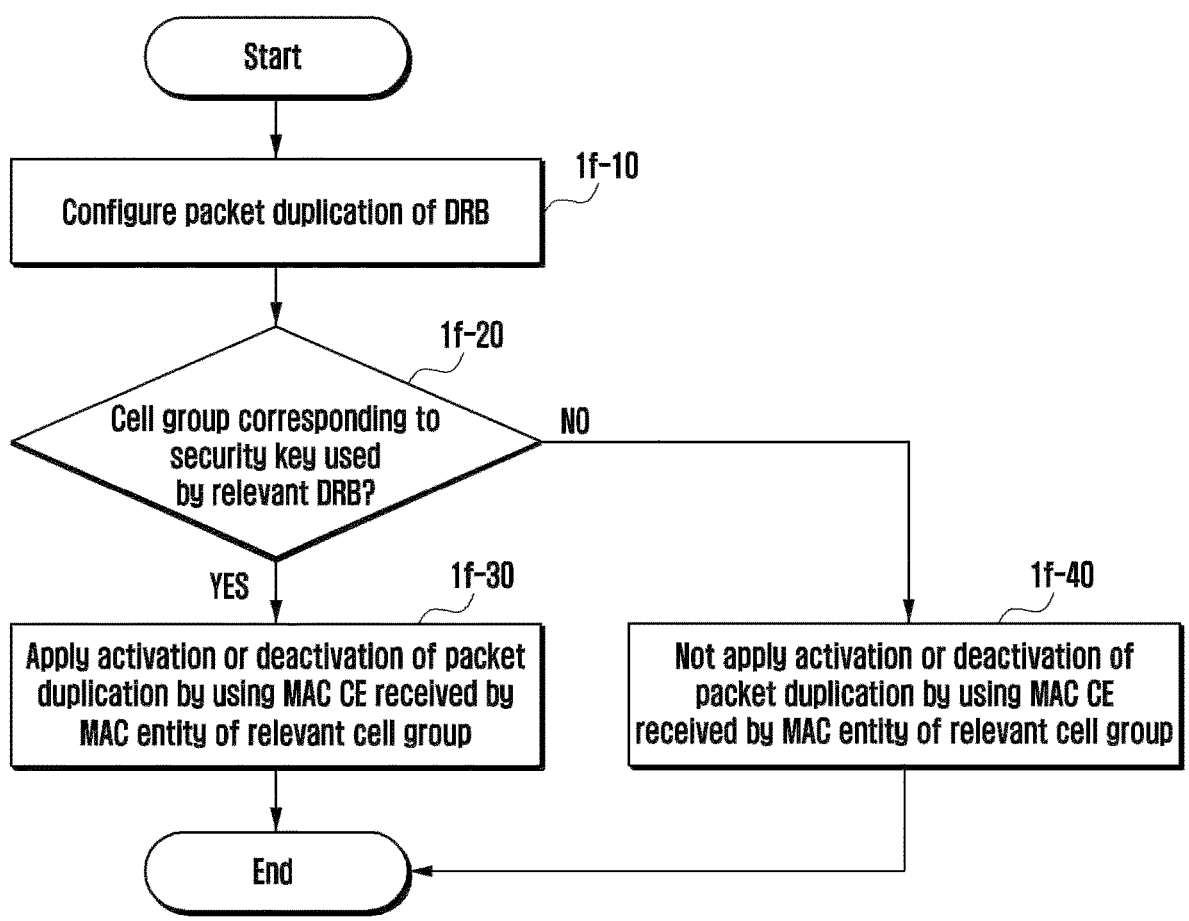
FIG. 1F is a flowchart illustrating a method for distinguishing between a message for applying an activation state or a deactivation state of a radio bearer and a message for not applying an activation state or a deactivation state of a radio bearer according to an embodiment of the disclosure.

FIG. 1F is a flowchart illustrating a method for distinguishing between a duplication activation/deactivation message for applying an activation state or a deactivation state of a radio bearer and a duplication activation/deactivation message for not applying an activation state or a deactivation state of a radio bearer according to an embodiment of the disclosure.

Referring to FIG. 1F, it may be assumed that a format of a packet duplication activation/deactivation message employs the MAC CE format described with reference to FIG. 1C, but the disclosure is not limited thereto. If packet duplication is configured for a DRB in operation 1f-10, then in operation 1f-20, a terminal may determine, for all CGs used by the terminal, whether a MAC CE, received on a particular cell group, is to be used to activate or deactivate packet duplication of a DRB of the cell group. In operation 1f-20, to which cell group a network node is connected, wherein a security key used by a DRB is a security key corresponding to the network node, may become a determination criterion. If the security key used by the DRB is a security key corresponding to a network node connected to a first cell group, in operation 1f-30, the terminal may apply activation or deactivation of packet duplication of the DRB by using a MAC CE transmitted on the first cell group. If the security key used by the DRB is not the security key corresponding to the network node connected to the first cell group, in operation 1f-40, the terminal does not apply the activation or deactivation of the packet duplication of the DRB by using the MAC CE transmitted on the first cell group. For example, if a security key used by the DRB is KgNB which is a security key of a master node, the terminal applies activation or deactivation of packet duplication of the DRB by using a MAC CE received on an MCG. If the security key used by the DRB is S-KgNB which is a security key of a secondary node, the terminal applies activation or deactivation of packet duplication of the DRB by using a MAC CE received on an SCG. However, although a MAC CE is not used to apply activation or deactivation of packet duplication to the DRB, a bitmap may correspond to the DRB in the MAC CE. Even if any bitmap of a MAC CE corresponds to the DRB, when the relevant MAC CE is not used to apply activation or deactivation of packet duplication, the terminal may ignore the bitmap.

Figure 1G:
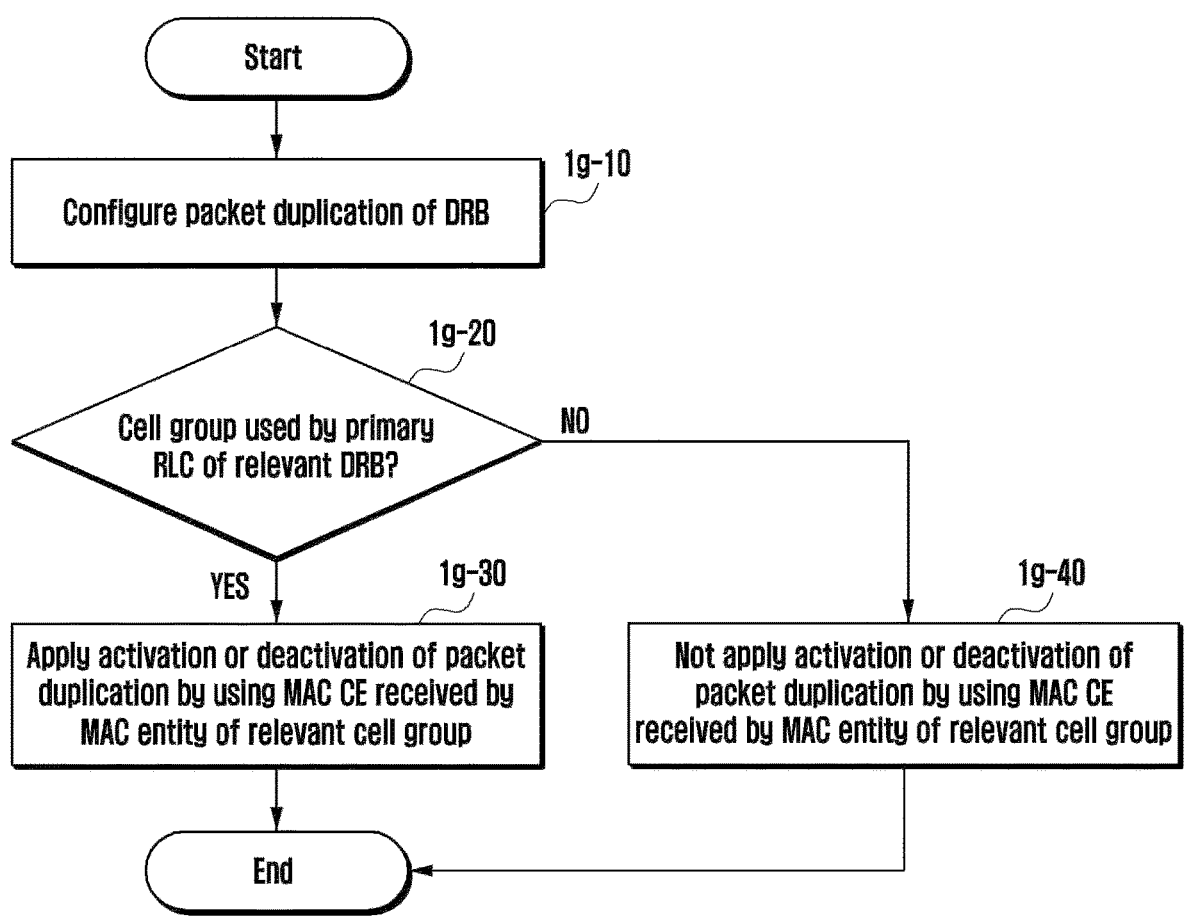
FIG. 1G is a flowchart illustrating a method for distinguishing between a message for applying an activation state or a deactivation state of a radio bearer and a message for not applying an activation state or a deactivation state of a radio bearer according to an embodiment of the disclosure.

FIG. 1G is a flowchart illustrating a method for distinguishing between a duplication activation/deactivation message for applying an activation state or a deactivation state of a radio bearer and a duplication activation/deactivation message for not applying an activation state or a deactivation state of a radio bearer according to an embodiment of the disclosure.

Referring to FIG. 1G, it may be assumed that a format of a packet duplication activation/deactivation message employs the MAC CE format described with reference to FIG. 1C, but the disclosure is not limited thereto. If packet duplication is configured for a DRB in operation 1g-10, then in operation 1g-20, a terminal may determine, for all CGs used by the terminal, whether a MAC CE, received on a particular cell group, is to be used to activate or deactivate packet duplication of a DRB of the cell group. In operation 1g-20, whether the relevant cell group is a cell group used by a primary RLC of the relevant DRB may become a determination criterion. If the primary RLC of the DRB is connected to a first cell group, in operation 1g-30, the terminal may apply activation or deactivation of packet duplication of the DRB by using a MAC CE transmitted on the first cell group. If the primary RLC of the DRB is not connected to the first cell group, in operation 1g-40, the terminal may not apply the activation or deactivation of the packet duplication of the relevant DRB by using the MAC CE transmitted on the first cell group. For example, if the primary RLC of the DRB is connected to an MCG, the terminal applies activation or deactivation of packet duplication of the DRB by using a MAC CE received on the MCG, and does not apply activation or deactivation of packet duplication of the DRB by using a MAC CE received on an SCG. However, although a MAC CE is not used to apply activation or deactivation of packet duplication to the DRB, a bitmap may correspond to the DRB in the MAC CE. Even if any bitmap of a MAC CE corresponds to the DRB, when the relevant MAC CE is not used to apply activation or deactivation of packet duplication, the terminal may ignore the bitmap.

Figure 1H:
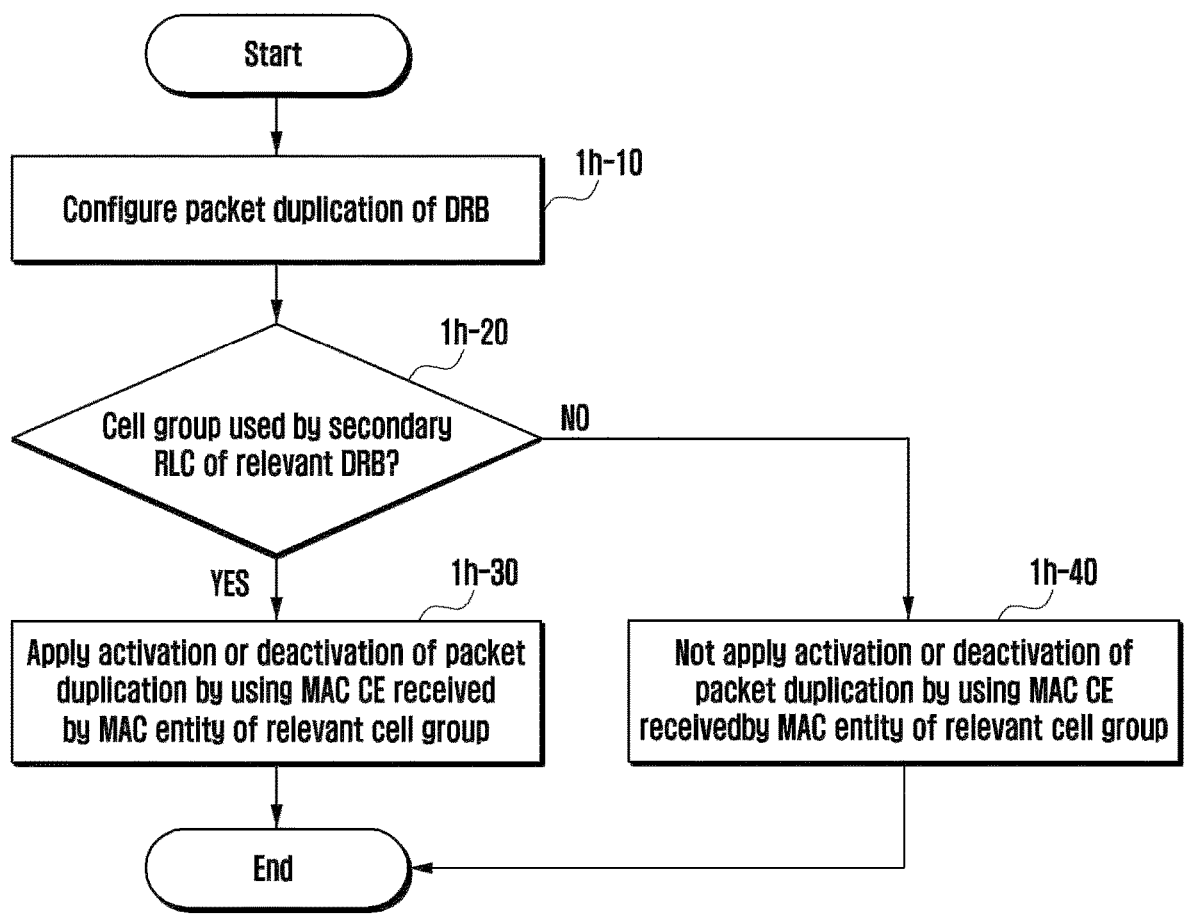
FIG. 1H is a flowchart illustrating a method for distinguishing between a message for applying an activation state or a deactivation state of a radio bearer and a message for not applying an activation state or a deactivation state of a radio bearer according to an embodiment of the disclosure.

FIG. 1H is a flowchart illustrating a method for distinguishing between a duplication activation/deactivation message for applying an activation state or a deactivation state of a radio bearer and a duplication activation/deactivation message for not applying an activation state or a deactivation state of a radio bearer according to an embodiment of the disclosure.

Referring to FIG. 1H, it may be assumed that a format of a packet duplication activation/deactivation message employs the MAC CE format described with reference to FIG. 1C, but the disclosure is not limited thereto. If packet duplication is configured for a DRB in operation 1h-10, then in operation 1h-20, a terminal may determine, for all CGs used by the terminal, whether a MAC CE, received on a particular cell group, is to be used to activate or deactivate packet duplication of the DRB. In operation 1h-20, whether the relevant cell group is a cell group used by a secondary RLC of the relevant DRB may become a determining criterion. If the secondary RLC of the DRB is connected to a first cell group, in operation 1h-30, the terminal may apply activation or deactivation of packet duplication of the DRB by using a MAC CE transmitted on the first cell group. If the secondary RLC of the DRB is not connected to the first cell group, in operation 1h-40, the terminal does not apply the activation or deactivation of the packet duplication of the DRB by using the MAC CE transmitted on the first cell group. For example, if the secondary RLC of the DRB is connected to an MCG, the terminal applies activation or deactivation of packet duplication of the DRB by using a MAC CE received on the MCG, and does not apply activation or deactivation of packet duplication of the DRB by using a MAC CE received on an SCG. However, although a MAC CE is not used to apply activation or deactivation of packet duplication to the DRB, a bitmap may correspond to the DRB in the MAC CE. Even if any bitmap of a MAC CE corresponds to the DRB, when the relevant MAC CE is not used to apply activation or deactivation of packet duplication, the terminal may ignore the bitmap.

Figure 1I:
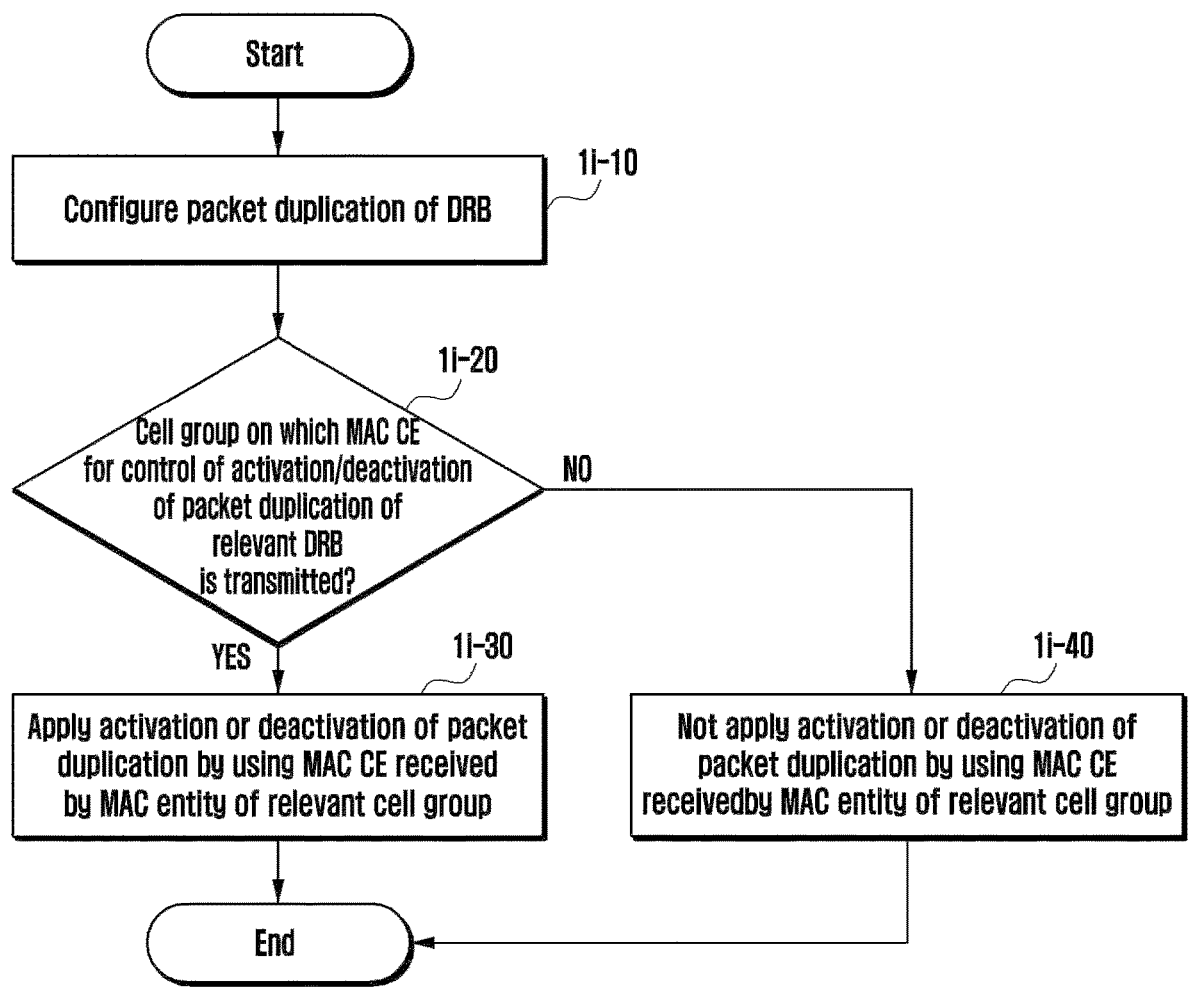
FIG. 1I is a flowchart illustrating a method for distinguishing between a message for applying an activation state or a deactivation state of a radio bearer and a message for not applying an activation state or a deactivation state of a radio bearer according to an embodiment of the disclosure.

FIG. 1I is a flowchart illustrating a method for distinguishing between a duplication activation/deactivation message for applying an activation state or a deactivation state of a radio bearer and a duplication activation/deactivation message for not applying an activation state or a deactivation state of a radio bearer according to an embodiment of the disclosure.

Referring to FIG. 1I, it may be assumed that a format of a packet duplication activation/deactivation message employs the MAC CE format described with reference to FIG. 1C, but the disclosure is not limited thereto. If packet duplication is configured for a DRB in operation 1i-10, then in operation 1i-20, a terminal may determine, for all CGs used by the terminal, whether a MAC CE, received on a particular cell group, is to be used to activate or deactivate packet duplication of the DRB. In operation 1i-20, whether a base station configures a cell group on which a MAC CE for application of activation or deactivation of packet duplication to the relevant DRB is to be transmitted, may become a determination criterion. In this example, the configuration by the base station may be indicated in the RRC configuration message of FIG. 1D. If a base station configures a cell group on which a MAC CE for control of activation or deactivation of packet duplication over the relevant DRB is to be transmitted, in operation 1i-30, the terminal may apply activation or deactivation of packet duplication of the DRB by using a MAC CE transmitted on the cell group. If the base station does not configure the cell group on which the MAC CE for control of activation or deactivation of packet duplication over the DRB is to be transmitted, in operation 1i-40, the terminal does not apply the activation or deactivation of the packet duplication of the DRB by using the MAC CE transmitted on the cell group. For example, if activation or deactivation of packet duplication of the DRB is configured such that the same is to be applied using a MAC CE received on an MCG, the terminal applies activation or deactivation of packet duplication of the DRB by using the MAC CE received on the MCG, and does not apply activation or deactivation of packet duplication of the DRB by using a MAC CE received on an SCG. However, although a MAC CE is not used to apply activation or deactivation of packet duplication to the DRB, a bitmap may correspond to the DRB in the MAC CE. Even if any bitmap of a MAC CE corresponds to the DRB, when the relevant MAC CE is not used to apply activation or deactivation of packet duplication, the terminal may ignore the bitmap.

Figure 1J:
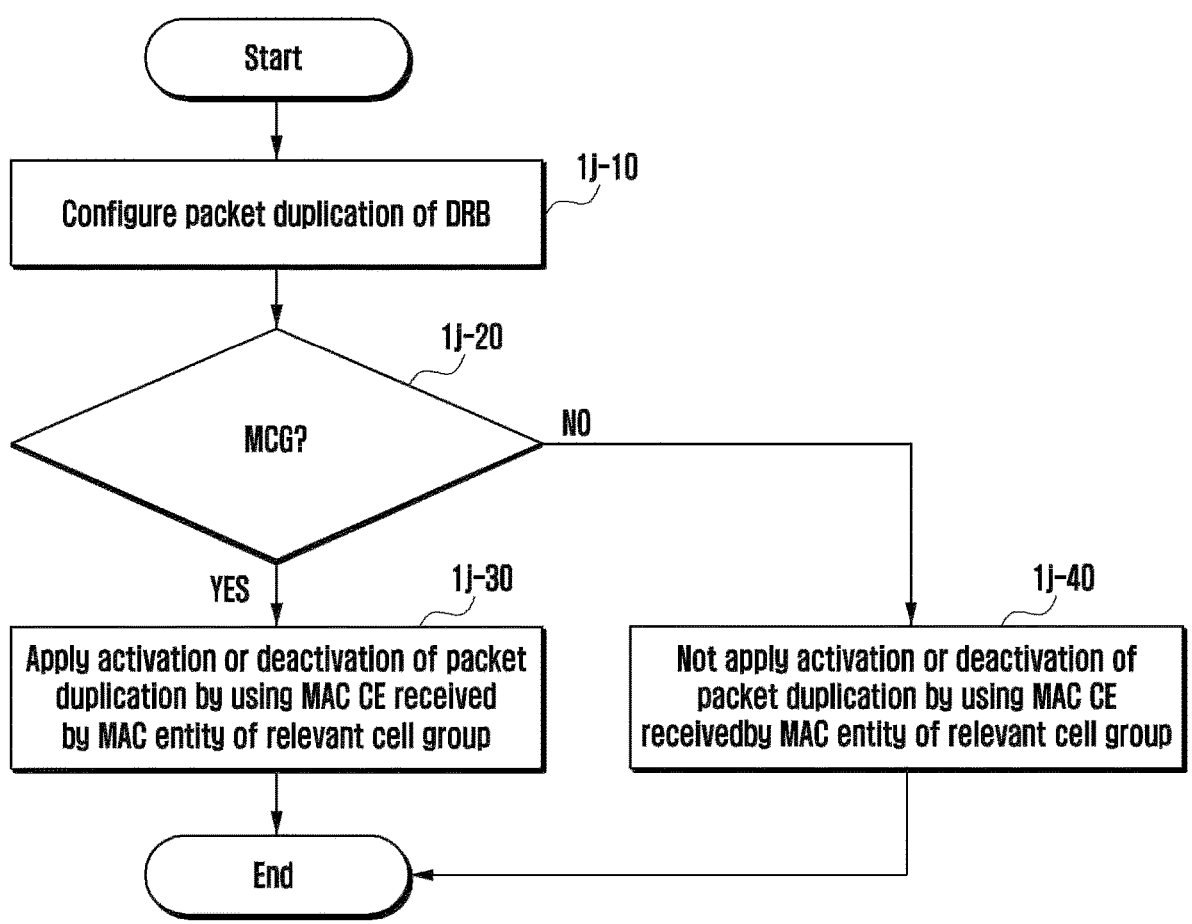
FIG. 1J is a flowchart illustrating a method for distinguishing between a message for applying an activation state or a deactivation state of a radio bearer and a message for not applying an activation state or a deactivation state of a radio bearer according to an embodiment of the disclosure.

FIG. 1J is a flowchart illustrating a method for distinguishing between a duplication activation/deactivation message for applying an activation state or a deactivation state of a radio bearer and a duplication activation/deactivation message for not applying an activation state or a deactivation state of a radio bearer according to an embodiment of the disclosure.

Referring to FIG. 1J, it may be assumed that a format of a packet duplication activation/deactivation message employs the MAC CE format described with reference to FIG. 1C, but the disclosure is not limited thereto. If packet duplication is configured for a DRB in operation 1j-10, then in operation 1j-20, a terminal may determine, for all CGs used by the terminal, whether a MAC CE, received on a particular cell group, is to be used to activate or deactivate packet duplication of the DRB. In this example, only the particular cell group may control activation or deactivation of packet duplication over the relevant DRB. In the embodiment of FIG. 1J, in operation 1j-30, the terminal applies activation or deactivation of packet duplication of each of all DRBs, for which packet duplication is configured, using only a MAC CE received on an MCG. In operation 1j-40, the terminal does not apply activation or deactivation of packet duplication by using a MAC CE received on another cell group which is not an MCG. However, although a MAC CE is not used to apply activation or deactivation of packet duplication to the DRB, a bitmap may correspond to the DRB in the MAC CE. Even if any bitmap of a MAC CE corresponds to the DRB, when the relevant MAC CE is not used to apply activation or deactivation of packet duplication, the terminal may ignore the bitmap. In the embodiment of FIG. 1J, it is assumed that activation or deactivation of packet duplication is controlled using only a MAC CE received on an MCG, but this criterion may be designated for an SCG or a particular cell group, and thus may be applied thereto.

Figure 1K:
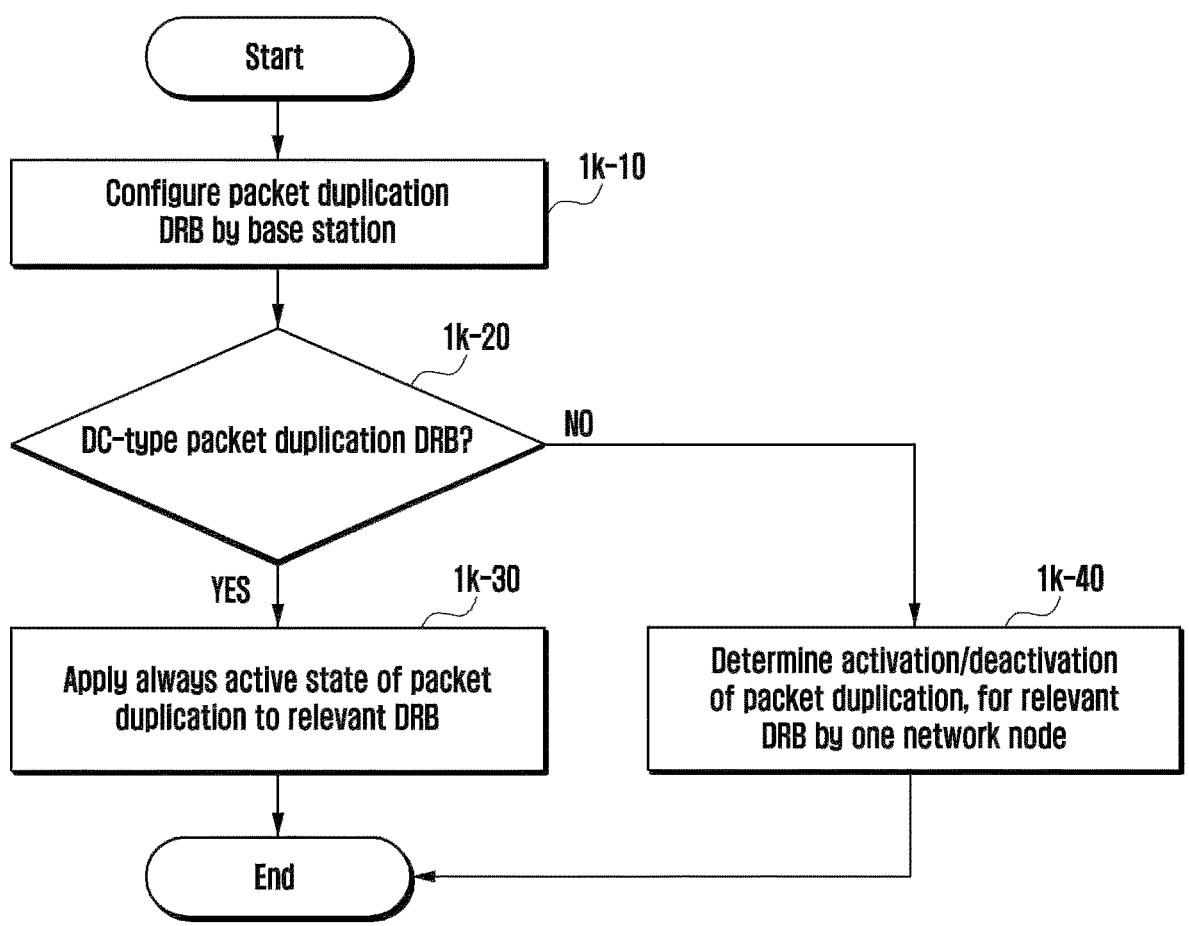
FIG. 1K is a flowchart illustrating a method for applying an activation or deactivation state of a radio bearer according to an embodiment of the disclosure.

FIG. 1K is a flowchart illustrating a method for applying an activation or deactivation state of a radio bearer according to an embodiment of the disclosure.

Referring to FIG. 1K, it may be assumed that a format of a packet duplication activation/deactivation message employs the MAC CE format described with reference to FIG. 1C, but the disclosure is not limited thereto. If packet duplication is configured for a DRB by a base station in operation 1k-10, then in operation 1k-20, a terminal may identify whether the relevant radio bearer is a dual connectivity-type radio bearer. In operation 1k-30, if the relevant DRB is a dual connectivity-type radio bearer, an always active state may be applied to packet duplication of the DRB. In this example, a base station may configure a MAC CE so as to always activate packet duplication of a dual connectivity-type radio bearer, for which packet duplication is configured, according to a pre-configured scheme. Alternatively, the terminal may always apply activation of packet duplication regardless of a value to which a MAC CE is set. If the DRB is not a dual connectivity-type radio bearer, in operation 1k-40, one node determines, for the DRB, activation or deactivation of packet duplication, and thus a MAC CE is not used to apply activation or deactivation of packet duplication of the DRB. However, although a MAC CE is not used to apply activation or deactivation of packet duplication to the DRB, a bitmap may correspond to the DRB in the MAC CE. Even if any bitmap of a MAC CE corresponds to the DRB, when the relevant MAC CE is not used to apply activation or deactivation of packet duplication, the terminal may ignore the bitmap.

Figure 1L:
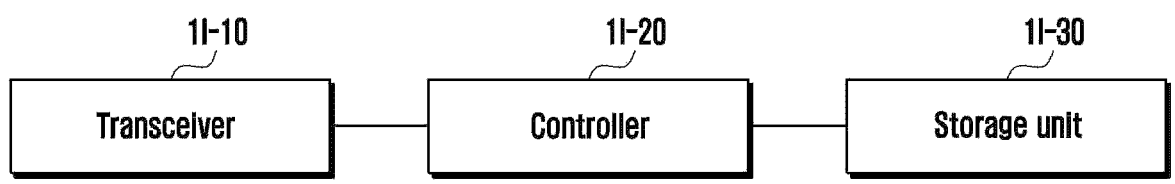
FIG. 1L is a block diagram illustrating a configuration of a terminal according to an embodiment of the disclosure.

FIG. 1L is a block diagram illustrating a configuration of a terminal according to an embodiment of the disclosure.

Referring to FIG. 1L, the terminal may include a transceiver 1l-10, a controller 1l-20, and a storage unit 1l-30. In the disclosure, the controller 1l-20 may be defined as a circuit, an ASIC, or at least one processor.

The transceiver 1l-10 may transmit or receive a signal to or from another network entity. For example, the transceiver 1l-10 may receive system information from a base station, and may receive a synchronization signal or a reference signal therefrom.

The controller 1l-20 may control an overall operation of the terminal according to an embodiment proposed in the disclosure. For example, the controller 1l-20 may control a signal flow between blocks so as to perform the above-described operations according to the flowcharts above.

The storage unit 1l-30 may store at least one piece of information among information transmitted or received through the transceiver 1l-10 and information generated through the controller 1l-20 of the terminal.

Figure 1M:
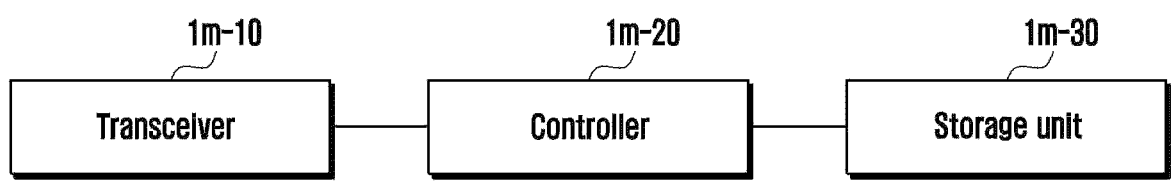
FIG. 1M is a block diagram illustrating a configuration of a base station according to an embodiment of the disclosure.

FIG. 1M is a block diagram illustrating a configuration of a base station according to an embodiment of the disclosure.

Referring to FIG. 1M, the base station may include a transceiver 1m-10, a controller 1m-20, and a storage unit 1m-30. In the disclosure, the controller 1m-20 may be defined as a circuit, an ASIC, or at least one processor.

The transceiver 1m-10 may transmit or receive a signal to or from another network entity. For example, the transceiver 1m-10 may transmit system information to a terminal, and may transmit a synchronization signal or a reference signal thereto.

The controller 1m-20 may control an overall operation of the base station according to an embodiment proposed in the disclosure. For example, the controller 1m-20 may control a signal flow between blocks so as to perform the above-described operations according to the flowcharts above.

The storage unit 1m-30 may store at least one piece of information among information transmitted or received through the transceiver 1m-10 and information generated through the controller 1m-20.

Second Embodiment

Figure 2A:
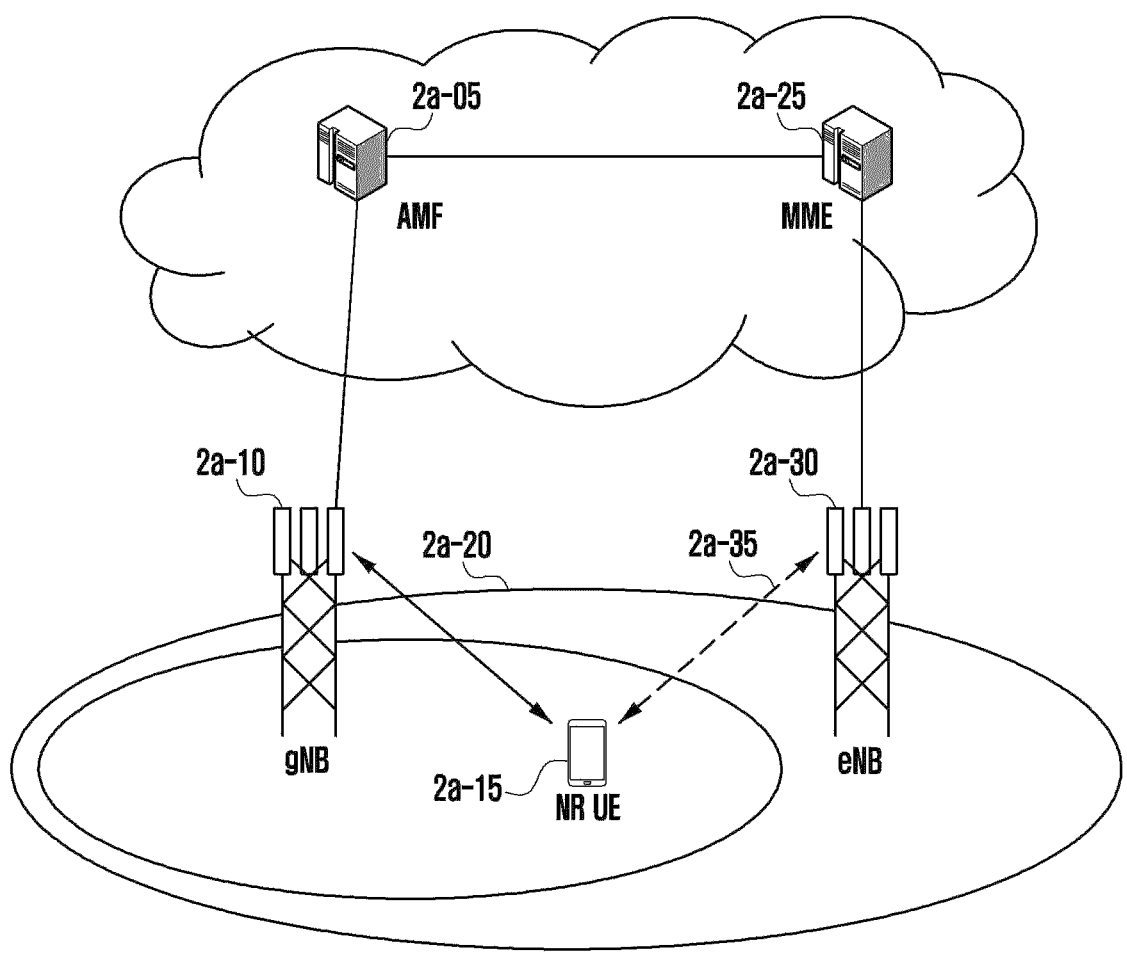
FIG. 2A illustrates a long-term evolution (LTE) base station connected to a next-generation mobile communication network according to an embodiment of the disclosure.

FIG. 2A illustrates a structure of a next-generation mobile communication system according to an embodiment of the disclosure.

Referring to FIG. 2A, a radio access network of the next-generation mobile communication system (NR) includes a next-generation base station (NR Node B) (hereinafter "gNB") 2a-10 and an access and mobility management function (AMF) (NR core network) 2a-05. A user equipment (NR user equipment) (hereinafter "NR UE," "UE," or "terminal") 2a-15 accesses an external network through the gNB 2a-10 and the AMF 2a-05.

In FIG. 2A, the gNB 2a-10 corresponds to an evolved Node B (eNB) of the existing long term evolution (LTE) system. The gNB 2a-10 is connected to the NR UE 2a-15 through a wireless channel and may provide a service superior to that provided by the existing Node B (as indicated by reference numeral 2a-20). In the next-generation mobile communication system, since all user traffics are provided through a shared channel, there is a need for an apparatus configured to collect state information, including a buffer state, an available transmission power state, a channel state, and the like of UEs, and thus perform scheduling, and the gNB 2a-10 serves as the apparatus. One gNB generally controls multiple cells. In order to implement ultra-high-speed data transmission in comparison to the current LTE, an existing maximum bandwidth or more may be provided, and the orthogonal frequency division multiplexing (hereinafter, referred to as "OFDM") may be used as wireless access technology and beamforming technology may be additionally combined therewith. Further, an adaptive modulation and coding (hereinafter, referred to as "AMC") scheme of determining a modulation scheme and a channel coding rate according to a channel state of a terminal is applied. The AMF 2a-05 performs functions, including mobility support, bearer configuration, quality of service (QoS) configuration, and the like. The AMF 2a-05 is a device serving to perform various control functions in addition to a mobility management function for the terminal, and is connected to multiple base stations. Further, the next-generation mobile communication system may interwork with the existing LTE system, and the AMF 2a-05 is connected to a mobility management entity (MME) 2a-25 of the LTE system through a network interface. The MME 2a-25 is connected to an eNB 2a-30 which is an existing base station. The terminal 2a-15 supporting LTE-NR dual connectivity may transmit or receive data while maintaining not only a connection with the gNB 2a-10 but also a connection with the eNB 2a-30 (as indicated by reference numeral 2a-35).

Figure 2B:
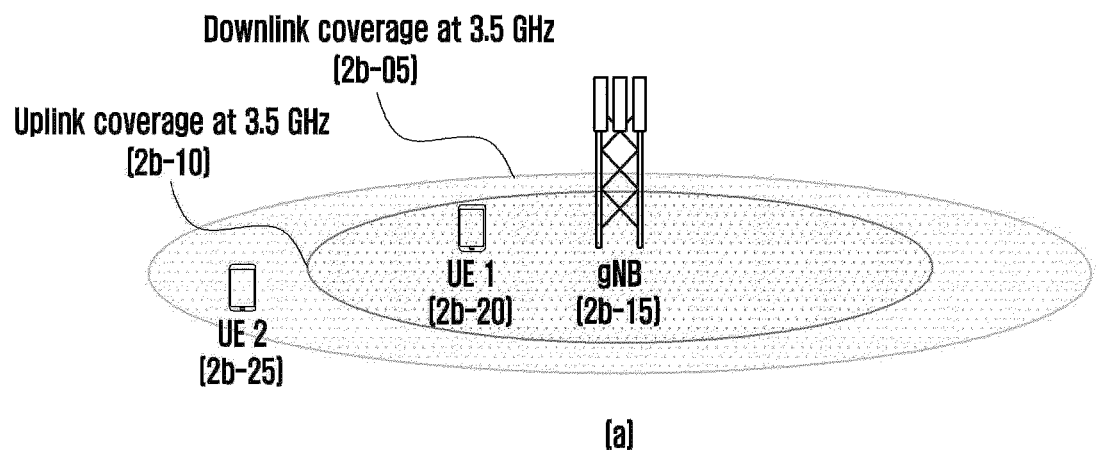
FIG. 2B illustrates additional application of an uplink frequency according to an embodiment of the disclosure.
Figure 2B:
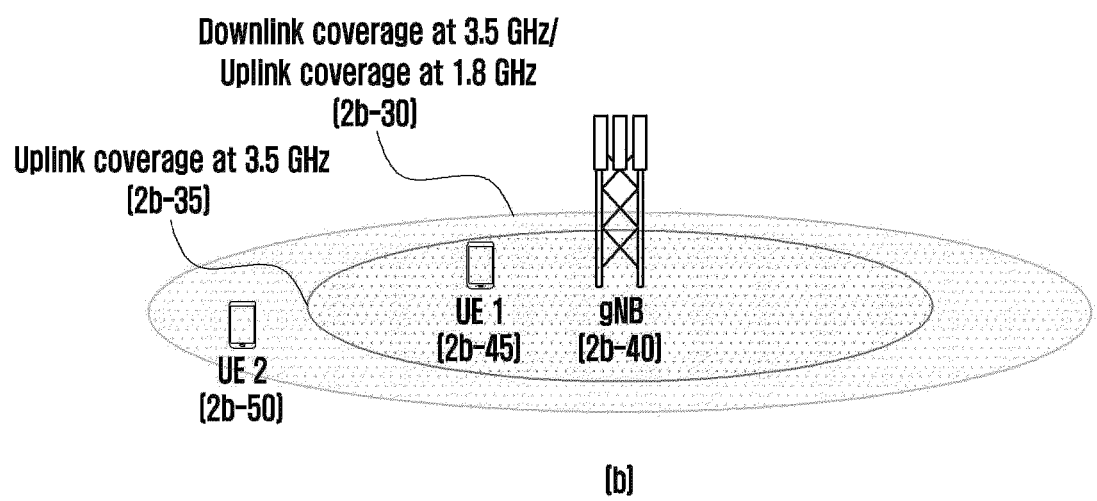

FIG. 2B illustrates additional application of an uplink frequency according to an embodiment of the disclosure.

Referring to FIG. 2B, in a mobile communication system, there may occur a phenomenon in which an uplink coverage does not coincide with a downlink coverage. The non-coincidence phenomenon occurs due to the difference between uplink channel characteristics and downlink channel characteristics, a limitation on maximum transmission power of a terminal, or a structural limitation of a transmission antenna. In general, a downlink coverage is larger than an uplink coverage. As an example, in a time division duplex (TDD) system in the 3.5 GHz band, a downlink coverage 2b-05 is larger than an uplink coverage 2b-10. In this example, a first terminal 2b-20 receives services in the uplink and in the downlink without any problem, but a second terminal 2b-25 experiences a problem in successfully transmitting data to a base station 2b-15 in the uplink. Therefore, in order to remove the problem due to the above-described non-coincidence, an effective downlink coverage may be reduced to coincide with the uplink coverage. That is, although a larger coverage can be provided in the downlink, the downlink coverage is limited down to the uplink coverage.

In order to solve a performance limitation due to such non-coincidence, the next-generation mobile communication system allows a terminal to apply an uplink frequency having a larger coverage. As an example, an uplink coverage at 1.8 GHz 2b-30 separate from the uplink coverage at 3.5 GHz is additionally provided to a terminal. The additional uplink frequency is referred to as a "supplementary uplink (SUL) frequency." Therefore, due to frequency characteristics, the lower a frequency band, the longer a propagation distance of a wireless signal. Therefore, 1.8 GHz, which is lower than 3.5 GHz, allows a larger coverage. As a result, a second terminal 2b-50 may successfully transmit data to a base station 2b-40 by using the uplink coverage at 1.8 GHz 2b-35. Also, a first terminal 2b-45 is not subjected to a coverage problem, but may use both the uplink coverage at 1.8 GHz and the uplink coverage at 3.5 GHz. Therefore, the first terminal 2b-45 may select one of 1.8 GHz and 3.5 GHz in order to disperse uplink access congestion, and may use the same. The additional uplink frequency may be an LTE frequency.

Both an NR uplink frequency and an SUL frequency may be configured for one terminal, and in this example, a physical uplink shared channel (PUSCH), which is an uplink data channel, may be transmitted in only one uplink in one moment. A physical uplink control channel (PUCCH) may also be transmitted in only one uplink in one moment, and may be transmitted in an uplink identical to, or different from, an uplink in which the PUSCH is transmitted.

Figure 2C:
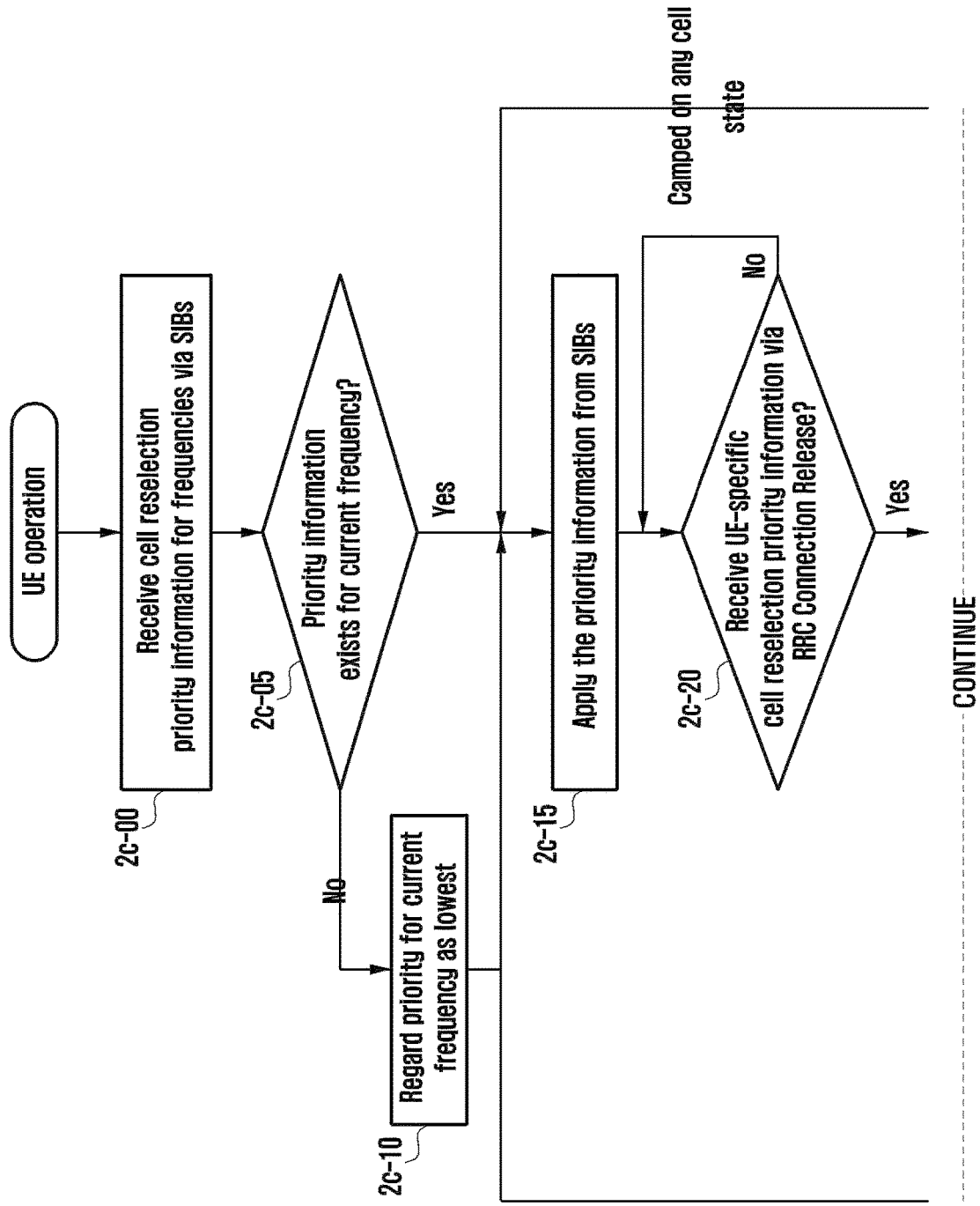
FIGS. 2CA and 2CB are flowcharts illustrating a process for broadcasting frequency-specific priority information for cell reselection via a system information block (SIB) or applying frequency-specific priority information for cell reselection to a particular terminal through a radio resource control (RRC) connection release message, which is dedicated RRC signaling, according to various embodiments of the disclosure.
Figure 2C:
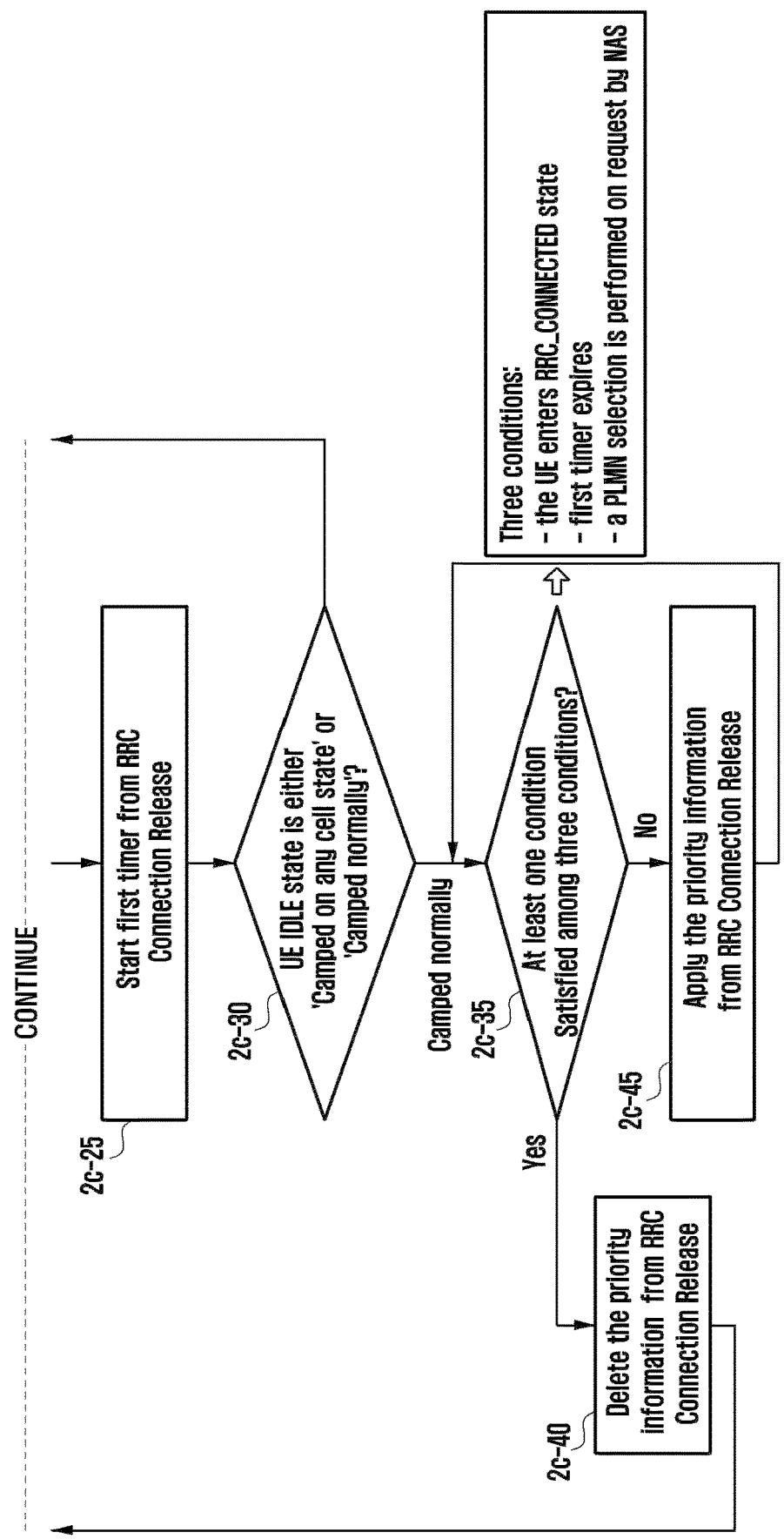

FIGS. 2CA and 2CB are portions of a flowchart illustrating a process for broadcasting frequency-specific priority information for cell reselection via an SIB or applying frequency-specific priority information for cell reselection to a particular terminal through an RRC connection release message, which is dedicated RRC signaling, in LTE technology according to various embodiments of the disclosure.

Referring to FIGS. 2CA and 2CB, cell reselection refers to a process for reselecting a serving cell so that a moving terminal can be connected to a cell having the best channel state. A network assigns a priority to each frequency, and thus controls cell reselection by terminals in an idle mode. For example, one terminal has received priority information for two frequencies f1 and f2, and if f1 has a higher priority than that of f2, the probability that the terminal will stay on f1 becomes higher. Further, although the terminal stays on f2, if a channel state of f2 is not good, the terminal may attempt to switch to f1. Priority information for frequencies may be broadcasted via an SIB, or may be provided to a particular terminal through an RRC connection release message which is dedicated RRC signaling. Although the terminal already has priority information for frequencies via an SIB, if the terminal receives UE-specific priority information through RRC signaling, the priority information of the SIB is disregarded. Priority information for each frequency is delivered through a cellReselectionPriority information element (IE) described below, and each frequency is assigned one of priorities having a total of (X+1) levels. A smaller value signifies a lower priority. That is, "0" signifies the lowest priority.

CellReselectionPriority Information Element

| | -- ASN1START | |
|---|---|---|
| CellReselectionPriority ::= | | INTEGER (0..X) |
| | -- ASN1STOP | |

Frequencies associated with radio access technology (RAT) may not be assigned the same priority. If an idle state of a terminal is a "camped on any cell state," frequency priority information received via an SIB is applied, and priority information received through RRC signaling is only stored without using the same. A cellReselectionPriority IE is an optional IE and may not exist. In this example, priority information for a corresponding frequency is not assigned. In this example, the terminal regards a priority of the corresponding frequency as the lowest level.

In operation 2c-00, the terminal receives priority information for frequencies, used by not only evolved universal terrestrial radio access (EUTRA) but also RAT other than the EUTRA, via SIBs. However, priority information for all the frequencies is not necessarily provided. Priority information for a frequency of a serving cell, on which the terminal currently camps, may also not be provided. In operation 2c-05, the terminal identifies whether priority information for a frequency of a current serving cell exists. If the priority information for the frequency of the current serving cell has not been provided, the terminal may regard a priority of the frequency as the lowest level at operation 2c-10.

In operation 2c-15, the terminal applies priority information for each frequency received via SIBs. If the terminal receives a radio resource control (RRC) connection release message from a base station, the terminal switches from a connected mode to an idle mode. The RRC connection release message may include priority information for frequencies. The priority information is user equipment (UE)-specific information, and in general, is applied in preference to frequency priority information received from SIBs. Therefore, in operation 2c-20, the terminal identifies whether the RRC connection release message includes frequency priority information. If the RRC connection release message includes frequency priority information, in operation 2c-25, the terminal applies a value of a first timer included together with the frequency priority information, and thus starts the first timer. In operation 2c-30, the terminal determines whether a current idle mode state is a "camped on any cell state" or a "camped normally state." A "camped normally state" refers to a state in which the terminal is camping on a suitable cell. A suitable cell can provide a normal service to the terminal, and satisfies the following specific conditions:

- A cell corresponds to one public land mobile network (PLMN) in a selected public land mobile network (PLMN) list, a registered PLMN list, or an equivalent PLMN list;
- A cell which is not barred;
- A cell satisfying a cell selection criterion;
- A "camped on any cell state" refers to a state in which the terminal fails to camp on a suitable cell, and thus is camping on an acceptable cell. In an acceptable cell, the terminal cannot receive a normal service and may attempt an emergency call. An acceptable cell satisfies the following conditions;
- A cell which is not barred; or
- A cell satisfying a cell selection criterion.

If the terminal is in an idle state corresponding to a "camped on any cell state," instead of applying the priority information received through the RRC connection release message, the terminal returns to operation 2c-15 and applies the frequency priority information received via the SIBs. If the terminal is in an idle state corresponding to a "camped normally state," in operation 2c-35, the terminal determines whether at least one condition among the following three conditions is satisfied. The three conditions are as follows:

- The terminal switches to a connected mode.
- The first timer has expired.
- A PLMN selection process is performed according to a non-access stratum (NAS) request.

If any one condition among the above-described conditions is satisfied, in operation 2c-40, the terminal deletes the priority information received through the RRC connection release message, and returns to operation 2c-15 and applies the frequency priority information received via the SIBs. In contrast, if any one condition is not satisfied, in operation 2c-45, the terminal applies the priority information received through the RRC connection release message.

The frequency priority information affects measurement of a particular frequency by the terminal. The terminal always performs measurement of a frequency having a priority higher than that of the current serving cell. In contrast, in order to save terminal power, the terminal does not perform measurement on a frequency (intra-frequency) identical to that of the serving cell or other frequencies each having a priority lower than or equal to that of the serving cell. Measurement is performed if QoS of the serving cell is less than or equal to a particular threshold. Cell reselection is performed in order to move to a cell having a good channel state, and since the current serving cell has good channel QoS, there is no reason why the terminal moves to a frequency having a priority lower than or equal to that of the serving cell. Therefore, whether to perform measurement is determined based on a particular threshold in order to reduce power consumption due to unnecessary channel measurement. In the case of the same frequency (intra-frequency), if the QoS of the serving cell is lower than or equal to a particular threshold SintraSearch, the terminal performs channel measurement on other cells having the same frequency. In the case of other frequencies each having a priority lower than or equal to that of the serving cell, if the QoS of the serving cell is lower than or equal to the particular threshold SintraSearch, the terminal performs channel measurement on corresponding cells having the other frequencies. In general, channel QoS considers reference signal received power (RSRP) and reference signal received quality (RSRQ).

If the channel QoS of a cell having a higher-priority frequency becomes higher than a particular threshold ThreshX-high while the terminal performs the measurement as described above, the terminal reselects the cell having the higher-priority frequency as a serving cell. If the channel QoS of a cell having a lower-priority frequency is higher than the particular threshold ThreshX-high and the QoS of the serving cell becomes lower than a ThreshServing-low, the terminal reselects the cell having the lower-priority frequency as a serving cell.

Figure 2D:
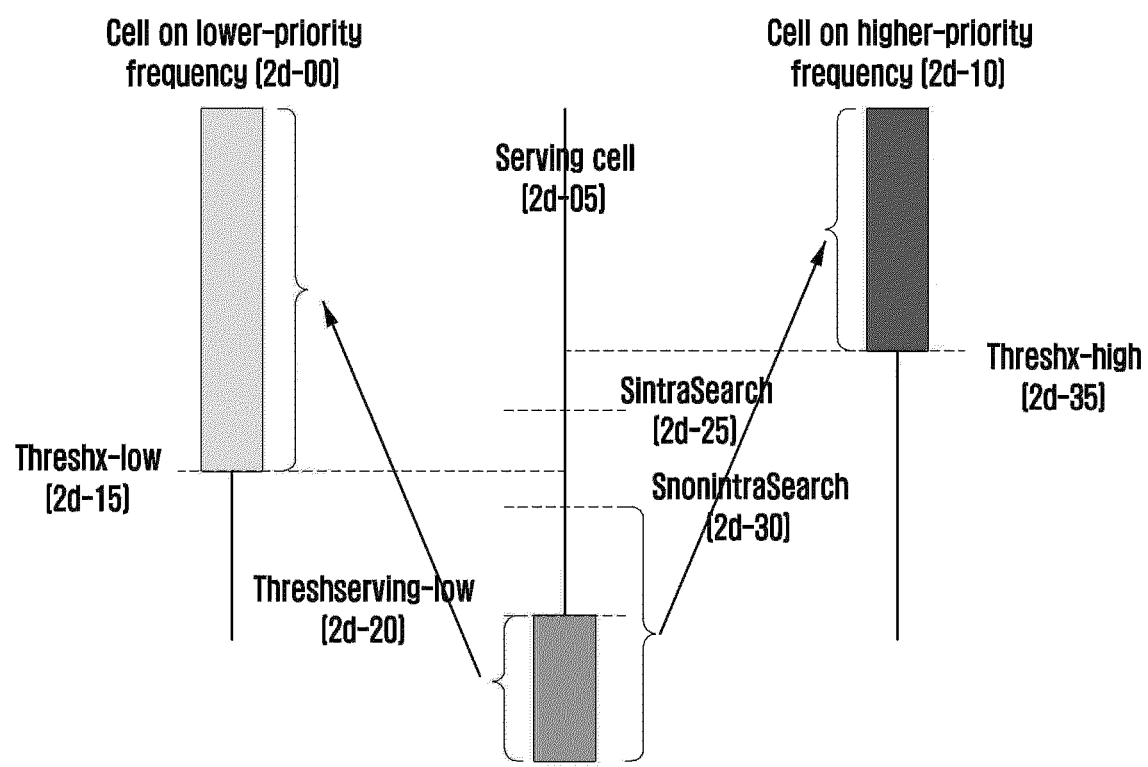
FIG. 2D illustrates a method for performing cell reselection by a terminal according to an embodiment of the disclosure.

FIG. 2D illustrates a method for performing cell reselection by a terminal according to an embodiment of the disclosure.

Referring to FIG. 2D, the terminal always performs inter-freq/RAT measurement on a higher-priority frequency or RAT regardless of a measurement signal strength for a serving cell 2d-05. If the measurement signal strength for the serving cell 2d-05 is lower than a SintraSearch 2d-25, the terminal performs intra-freq measurement. If the measurement signal strength for the serving cell 2d-05 is lower than a SnonintraSearch 2d-30, the terminal performs inter-freq/RAT measurement on a frequency having a priority lower than or equal to that of a frequency of the current serving cell 2d-05. The reason for stepwise triggering the terminal measurement is to reduce the power consumption of the terminal due to measurement of a neighbor cell. If channel QoS of a cell 2d-10 having a higher-priority frequency becomes higher than a particular threshold ThreshX-high 2d-35, the terminal reselects the cell 2d-10 having the higher-priority frequency as a new serving cell. If channel QoS of a cell 2d-00 having a lower-priority frequency is higher than a particular threshold ThreshX-low 2d-15 and QoS of the serving cell 2d-05 becomes lower than a ThreshServing-low 2d-20, the terminal reselects the cell 2d-00 having the lower-priority frequency as a new serving cell.

RSRP or RSRQ may be considered during cell reselection. The RSRP or RSRQ signifies a value calculated according to S-criteria. That is, the RSRP or RSRQ is Srxlev or Squal.

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

wherein:

| | |
|---|---|
| Srxlev | Cell selection RX level value (dB) |
| Squal | Cell selection quality value (dB) |
| $Qoffset_{temp}$ | Offset temporarily applied to a cell as specified in [3] (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from q-RxLevMinSUL, if present, in SIB1, else Qrxlevmin is obtained from q-RxLevMin in SIB1. |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [9] |

-continued

| | |
|---|---|
| $Q_{qualminoffset}$ | Offset to the signalled $Q_{qualmin}$ taken into account in the Squal evaluation as a result of a periodic search for a higher priority PLMN while camped normally in a VPLMN [9] |
| $P_{compensation}$ | If the UE supports the additionalPmax in the NS-PmaxList, if present, in SIB1: $\max(P_{EMAX1} - P_{PowerClass}, 0) - (\min(P_{EMAX2}, P_{PowerClass}) - \min(P_{EMAX1}, P_{PowerClass}))$ (dB); else: $\max(P_{EMAX1} - P_{PowerClass}, 0)$ (dB) |

In particular, in the case of inter-RAT cell reselection to NR, Srxlev is used and a value of Srxlev is compared with the particular threshold ThreshX-high or ThreshX-low.

In an embodiment, if a long term evolution (LTE) base station provides a value of q-RxLevMinSUL in relation to a particular NR frequency through system information and the terminal supports an SUL, when the terminal performs inter-RAT cell reselection to an NR cell belonging to the NR frequency, the terminal applies a value of q-RxLevMinSUL as a value of $Q_{rxlevmin}$ of Srxlev, and thus derives a value of Srxlev. A value of q-RxLevMinSUL is provided for each NR frequency, and if NR cells belonging to the particular NR frequency support an SUL, a value of q-RxLevMinSUL for the particular NR frequency is provided. For an NR frequency which does not support an SUL, a value of q-RxLevMinSUL is not provided. If RSRQ is used, a base station separately broadcasts Threshserving-lowQ, ThreshX-lowQ, and ThreshX-highQ, and provides the same to the terminal. If RSRP is used, Threshserving-lowP, ThreshX-lowP, and ThreshX-highP are employed.

Figure 2E:
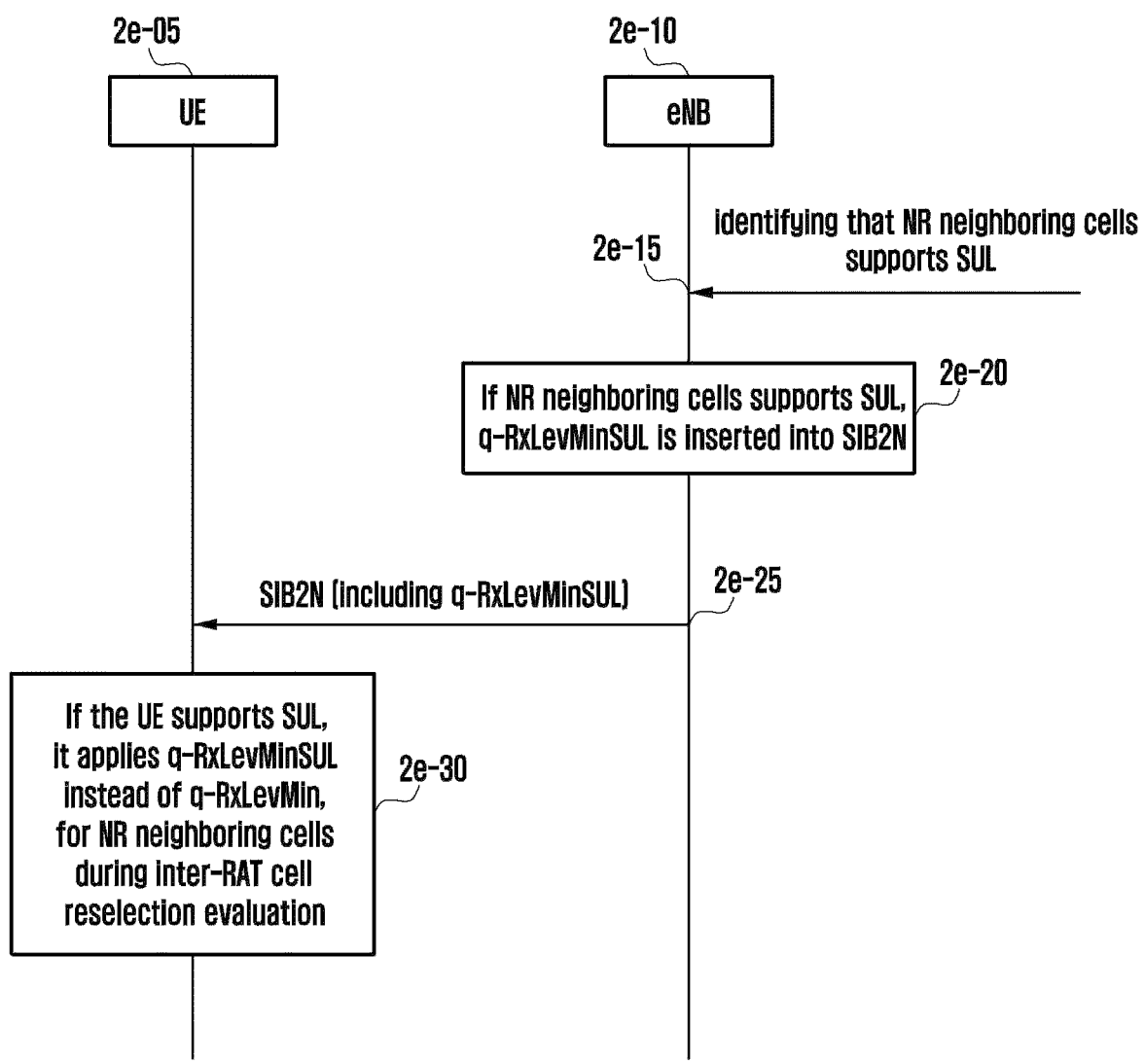
FIG. 2E is a flowchart illustrating an operation of a terminal, which is camping on LTE, for performing cell reselection to a new radio (NR) cell in Embodiment 2-1, according to an embodiment of the disclosure.

FIG. 2E is a flowchart illustrating an operation of a terminal, which is camping on LTE, for performing cell reselection to an NR cell in Embodiment 2-1 according to an embodiment of the disclosure.

Referring to 2E, in operation 2e-15, an LTE base station 2e-10 determines whether a neighboring NR base station supporting an SUL exists. If a neighboring NR base station supporting an SUL exists, inter-RAT cell reselection to the neighboring NR base station may be needed. To this end, the LTE base station 2e-10 includes, in SIB2N which is one piece of system information, cell reselection parameter information necessary when the inter-RAT cell reselection to the neighboring NR base station supporting an SUL is performed. If the neighboring NR base station supports an SUL, in operation 2e-20, the necessary cell reselection parameter at least includes q-RxLevMinSUL. If the neighboring NR base station does not support the SUL, a value of q-RxLevMinSUL is not included in the SIB2N. However, a value of q-RxLevMin may be included in SIB2N for each NR frequency, regardless of whether NR cells belonging to a particular NR frequency support an SUL function. A value of q-RxLevMinSUL is provided for each NR frequency. The SIB2N is system information that only a terminal supporting NR can understand, and mainly includes information on inter-RAT cell reselection to NR. Therefore, a terminal, which does not support NR, does not need to receive the SIB2N.

In operation 2e-25, if a terminal 2e-05, which is currently camping on one LTE cell, supports a connection with an NR system, the terminal receives SIB2N that the LTE base station is broadcasting. In operation 2e-30, if the terminal 2e-05 supports an SUL function, in order to derive a value of Srxlev in the cell reselection, the terminal 2e-05 applies q-RxLevMinSUL included in the SIB2N, as a value of 0, rxlevmin. If the terminal 2e-05 does not support the SUL function, in order to derive a value of Srxlev in the cell reselection, the terminal 2e-05 applies q-RxLevMin included in the SIB2N, as the value of 0, rxlevmin.

Figure 2F:
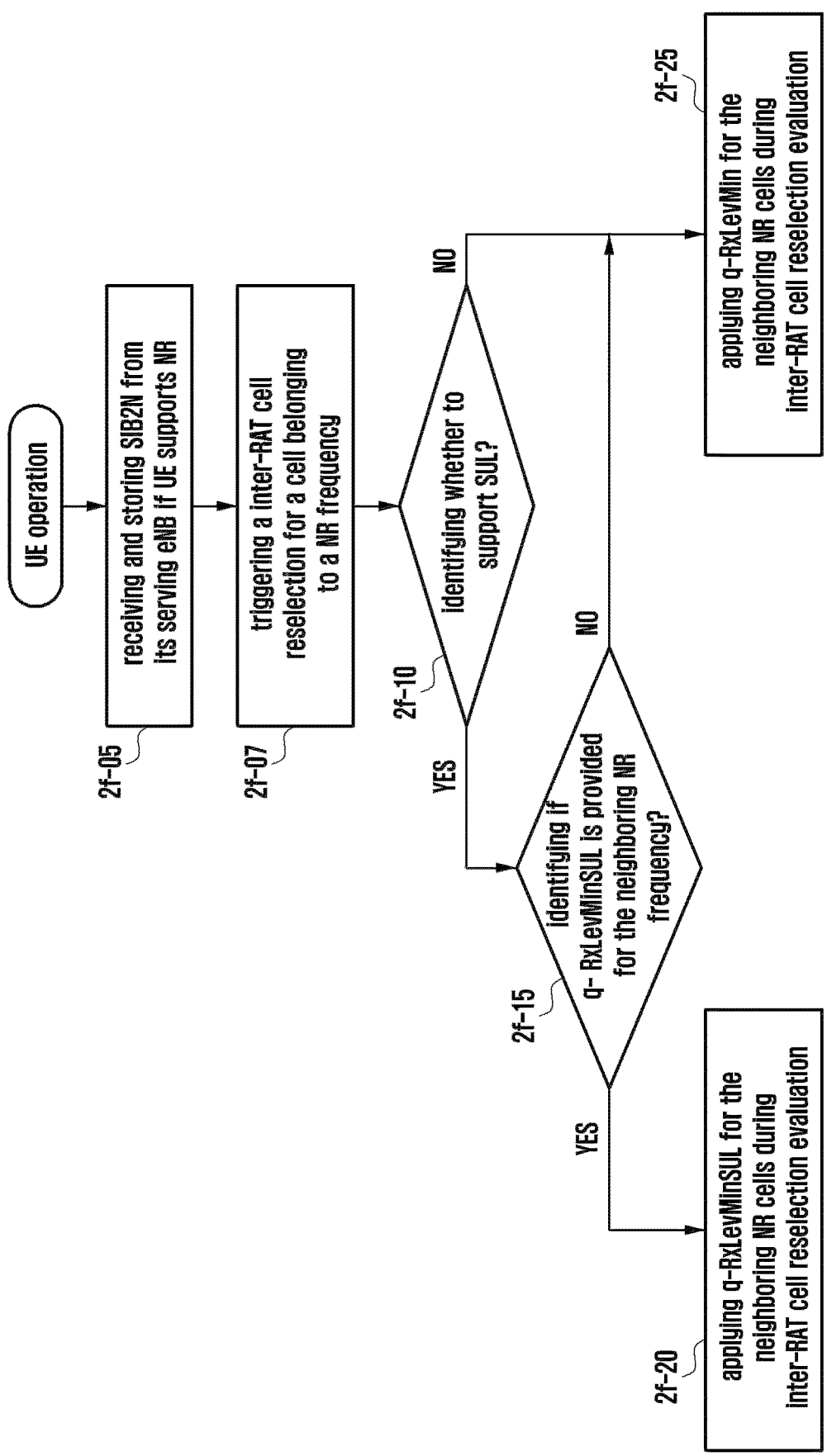
FIG. 2F is a flowchart illustrating an operation of a terminal, which is camping on LTE, for performing cell reselection to an NR cell in Embodiment 2-1 according to an embodiment of the disclosure.

FIG. 2F is a flowchart illustrating an operation of a terminal, which is camping on LTE, for performing cell reselection to an NR cell in Embodiment 2-1 according to an embodiment of the disclosure.

Referring to FIG. 2F, in operation 2f-05, if the terminal, which is camping on an LTE base station, supports NR, the terminal receives SIB2N from the LTE base station, and stores information included in the SIB2N. The SIB2N is mainly used to provide parameters necessary for inter-RAT cell reselection to NR.

In operation 2f-07, the terminal triggers an inter-RAT cell reselection operation, for one NR cell belonging to a particular NR frequency.

In operation 2f-10, the terminal determines whether the terminal itself supports an SUL function. If the terminal itself supports an SUL function, the terminal proceeds to operation 2f-15. If the terminal itself does not support the SUL function, the terminal proceeds to operation 2f-25.

In operation 2f-15, the terminal determines whether the received SIB2N includes a value of q-RxLevMinSUL corresponding to the particular NR frequency. A value of q-RxLevMinSUL may be provided for each NR frequency, and if all NR cells belonging to the particular NR frequency support an SUL function, a value of q-RxLevMinSUL for the particular NR frequency should be provided. If the SIB2N includes the value of q-RxLevMinSUL corresponding to the particular NR frequency, the terminal proceeds to operation 2f-20. If the SIB2N does not include the value of q-RxLevMinSUL corresponding to the particular NR frequency, the terminal proceeds to operation 2f-25.

If the terminal supports the SUL function and the value of q-RxLevMinSUL corresponding to the particular NR frequency is provided, in operation 2f-20, during inter-RAT cell reselection to the particular NR frequency which supports an SUL, the terminal applies the value of the received q-RxLevMinSUL as a value of $Q_{rxlevmin}$ of Srxlev.

If the terminal does not support the SUL function or the value of q-RxLevMinSUL corresponding to the particular NR frequency is not provided, in operation 2f-25, the terminal applies a value of the received q-RxLevMin as $Q_{rxlevmin}$ of Srxlev.

Figure 2G:
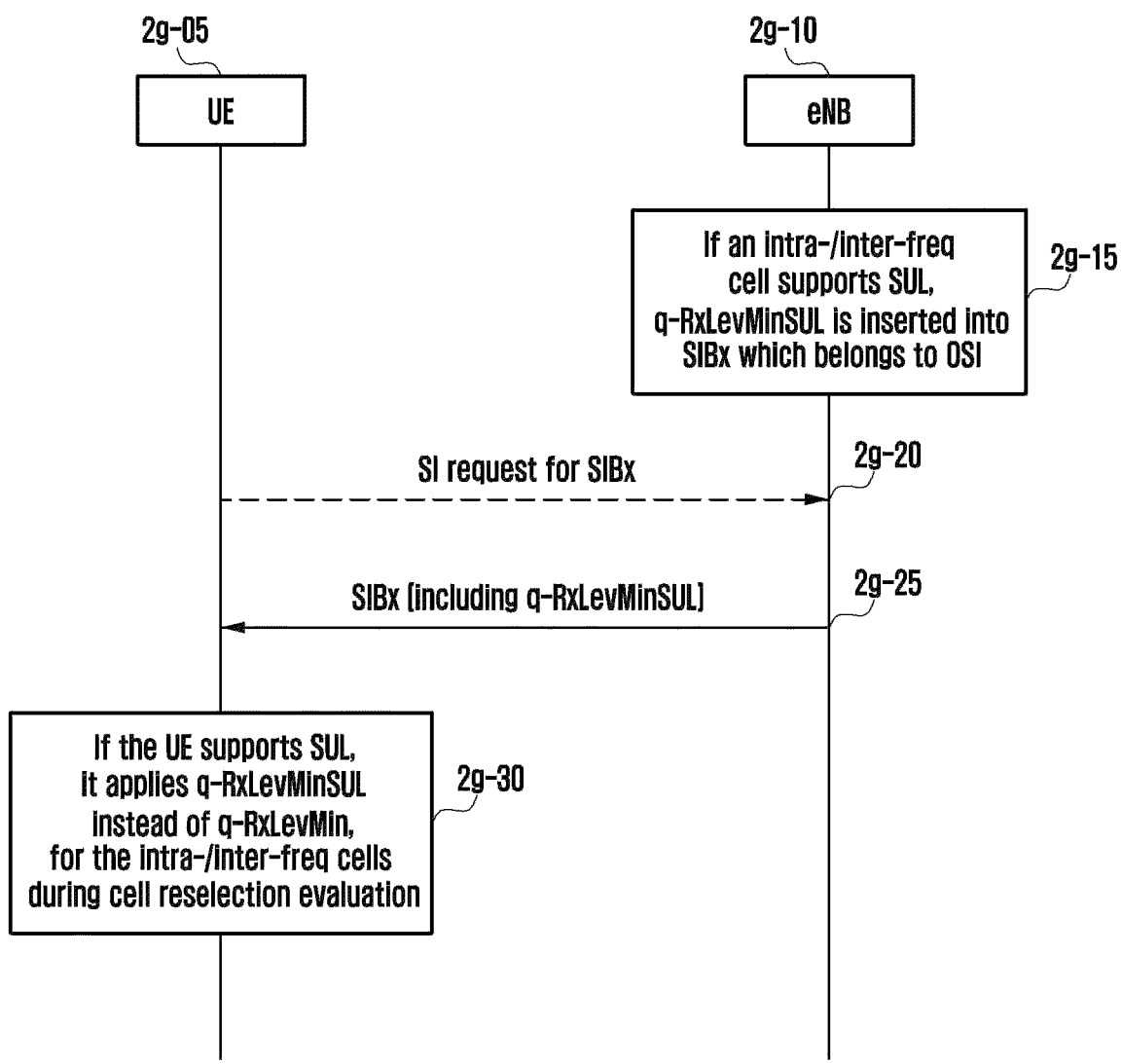
FIG. 2G is a flowchart illustrating an operation of a terminal, which is camping on NR, for performing cell reselection to a neighboring NR cell in Embodiment 2-2, according to an embodiment of the disclosure.

FIG. 2G is a flowchart illustrating an operation of a terminal, which is camping on NR, for performing cell reselection to a neighboring NR cell in Embodiment 2-2 according to an embodiment of the disclosure.

Referring to FIG. 2G, in operation 2g-15, an NR base station 2g-10 which is a neighboring NR base station supporting an SUL includes, in SIBx which is one piece of system information, cell reselection parameter information necessary when cell reselection to an NR cell belonging to an identical or different frequency (intra-/inter-freq cell reselection) is performed. As an example, parameters related to intra-freq cell reselection are included in SIB2, and parameters related to inter-freq cell reselection are included in SIB4. The SIBx may belong to other system information (OSI). That is, the system information is periodically broadcasted according to the determination made by a base station, or is broadcasted only during a predetermined period of time in response to a request 2g-20 of a terminal. In operation 2g-25, if a neighboring NR base station supports an SUL, the SIBx may at least include q-RxLevMinSUL as a necessary cell reselection parameter. If the neighboring NR base station does not support an SUL, the SIBx does not include a value of q-RxLevMinSUL. However, a value of q-RxLevMin is included in SIBx for each NR frequency, regardless of whether NR cells belonging to a particular NR frequency support an SUL function. A value of q-RxLevMinSUL is provided for each NR frequency. In operation 2g-30, if a terminal 2g-05, which is currently camping on one NR cell, supports an SUL function, in order to derive a value of Srxlev in the cell reselection, the terminal applies q-RxLevMinSUL included in the SIBx, as a value of $Q_{rxlevmin}$. If the terminal 2g-05 does not support the SUL function, in order to derive a value of Srxlev in the cell reselection, the terminal applies q-RxLevMin included in the SIBx, as a value of $Q_{rxlevmin}$.

Figure 2H:
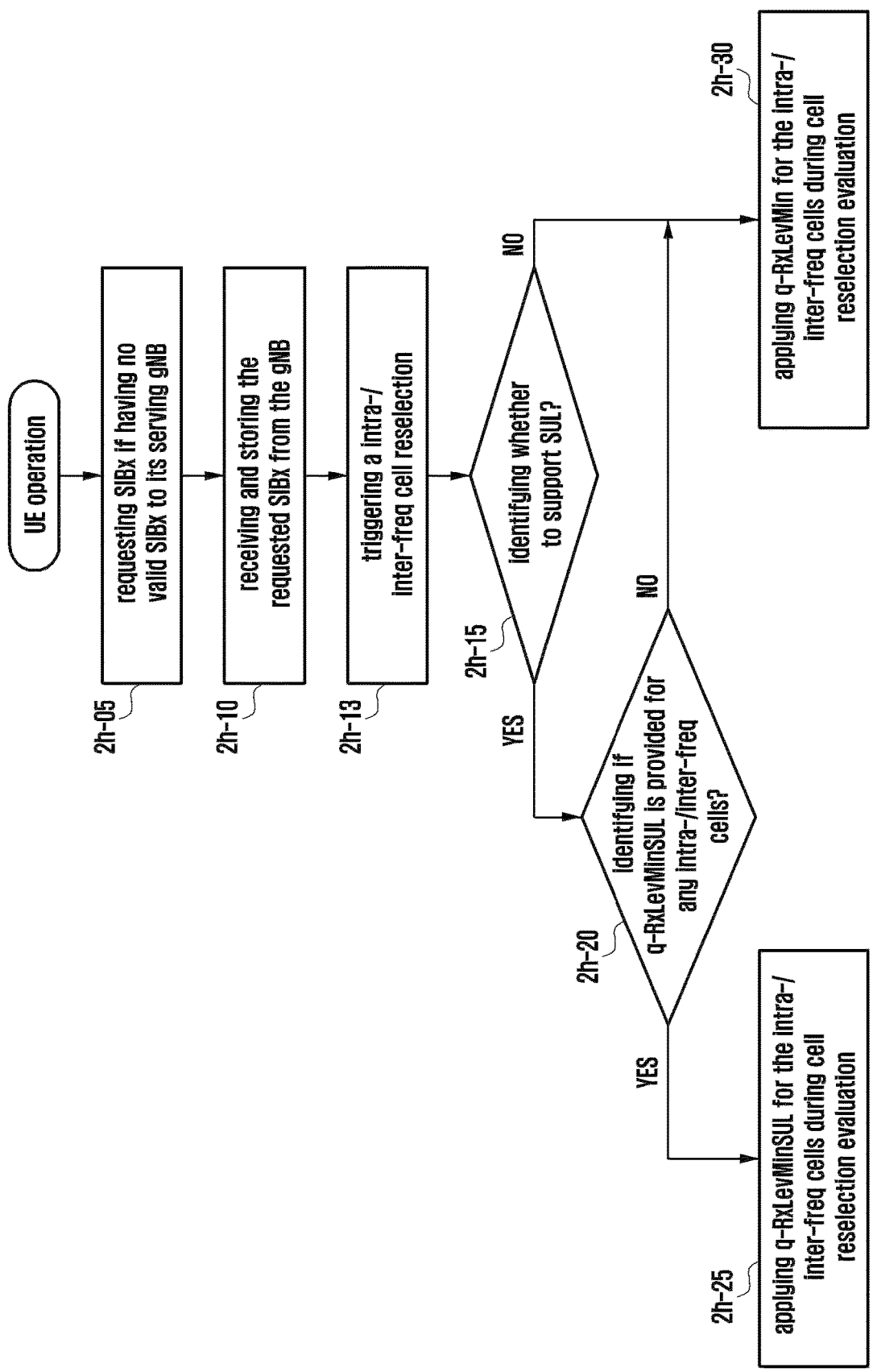
FIG. 2H is a flowchart illustrating an operation of a terminal, which is camping on NR, for performing cell reselection to a neighboring NR cell in Embodiment 2-2, according to an embodiment of the disclosure.

FIG. 2H is a flowchart illustrating an operation of a terminal, which is camping on NR, for performing cell reselection to a neighboring NR cell in Embodiment 2-2 according to an embodiment of the disclosure.

Referring to FIG. 2H, in operation 2h-05, if the terminal does not store a valid SIBx, the terminal requests a current serving NR base station for the system information.

In operation 2h-10, the terminal stores an SIBx received from the serving base station.

In operation 2h-13, the terminal triggers an intra-/inter-freq cell reselection operation, for one NR cell belonging to a particular NR frequency.

In operation 2h-15, the terminal determines whether the terminal itself supports an SUL function. If the terminal itself supports an SUL function, the terminal proceeds to operation 2h-20. If the terminal itself does not support the SUL function, the terminal proceeds to operation 2h-30.

In operation 2h-20, the terminal determines whether the received SIBx includes a value of q-RxLevMinSUL corresponding to the particular NR frequency. A value of q-RxLevMinSUL may be provided for each NR frequency, and if all NR cells belonging to the particular NR frequency support an SUL function, the value of q-RxLevMinSUL for the particular NR frequency should be provided. If the received SIBx includes the value of q-RxLevMinSUL corresponding to the particular NR frequency, the terminal proceeds to operation 2h-25. If the received SIBx does not include the value of q-RxLevMinSUL corresponding to the particular NR frequency, the terminal proceeds to operation 2h-30.

If the terminal supports the SUL function and the value of q-RxLevMinSUL corresponding to the particular NR frequency is provided, in operation 2h-25, during intra-/inter-freq cell reselection to the particular frequency which supports an SUL, the terminal applies the value of the received q-RxLevMinSUL as a value of $Q_{rxlevmin}$ of Srxlev.

If the terminal does not support the SUL function or the value of q-RxLevMinSUL corresponding to the particular NR frequency is not provided, in operation 2h-30, the terminal applies a value of the received q-RxLevMin as a value of $Q_{rxlevmin}$ of Srxlev.

Figure 2I:
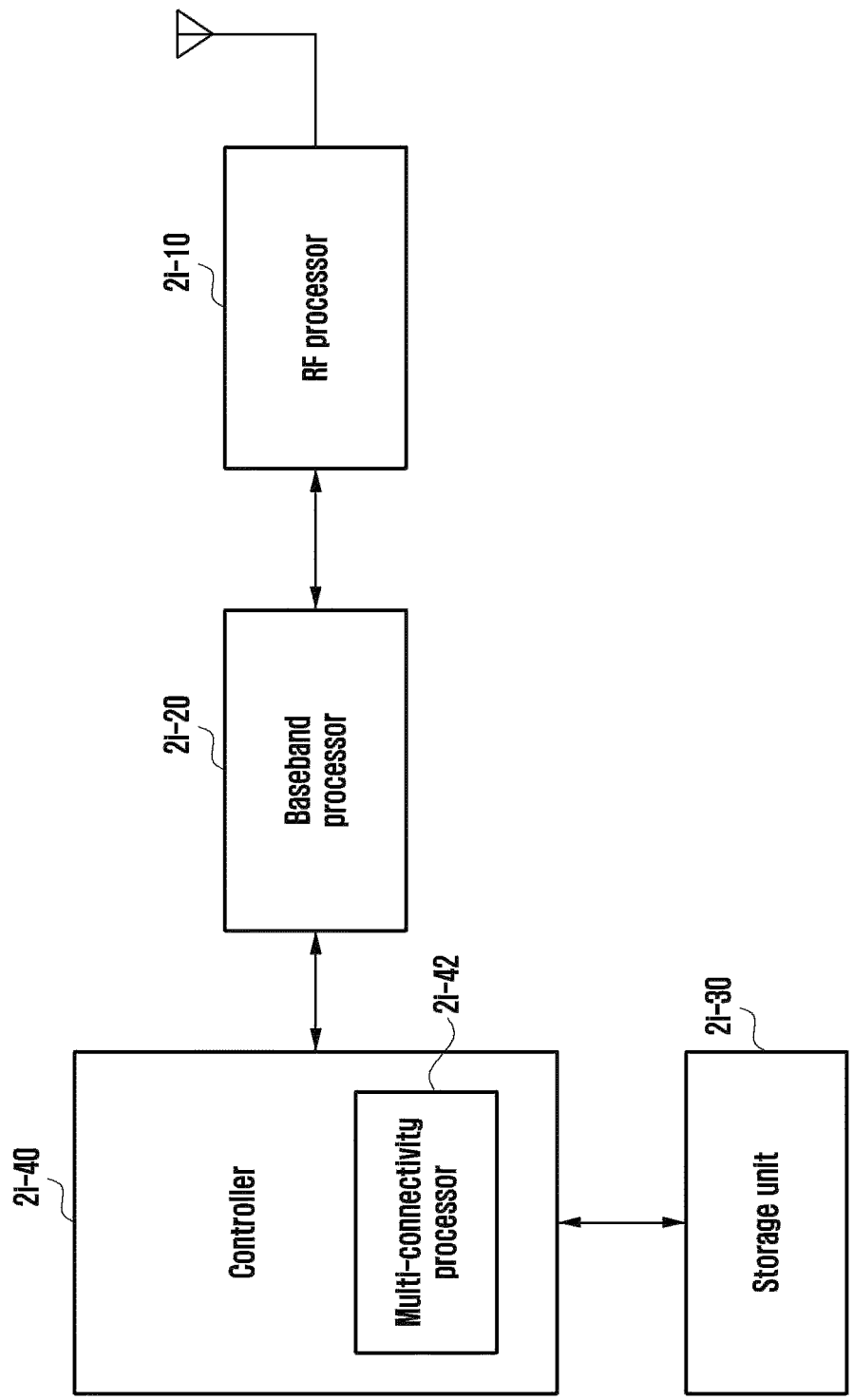
FIG. 2I is a block diagram illustrating a configuration of a terminal according to an embodiment of the disclosure.

FIG. 2I is a block diagram illustrating a configuration of a terminal according to an embodiment of the disclosure.

Referring to FIG. 2I, the terminal includes a radio frequency (RF) processor 2i-10, a baseband processor 2i-20, a storage unit 2i-30, and a controller 2i-40. The controller 2i-40 may further include a multi-connectivity processor 2i-42.

The RF processor 2i-10 serves to transmit or receive a signal through a wireless channel, such as band conversion and amplification of a signal. That is, the RF processor 2i-10 up-converts a baseband signal provided by the baseband processor 2i-20 into an RF band signal and then transmits the RF band signal through an antenna and down-converts an RF band signal received through the antenna into a baseband signal. For example, the RF processor 2i-10 may include a transmission filter, a reception filter, an amplifier, a mixer, an oscillator, a digital-to-analog converter (DAC), an analog-to-digital converter (ADC), or the like. FIG. 2I illustrates only one antenna but the terminal may be provided with multiple antennas. Also, the RF processor 2i-10 may include multiple RF chains. Further, the RF processor 2i-10 may perform beamforming. For the beamforming, the RF processor 2i-10 may adjust a phase and a magnitude of each of the signals transmitted or received through multiple antennas or antenna elements. Further, the RF processor 2i-10 may perform MIMO and may receive multiple layers during execution of a multiple-input and multiple-output (MIMO) operation.

The baseband processor 2i-20 performs a conversion function between a baseband signal and a bit stream according to a physical layer standard of a system. For example, when data is transmitted, the baseband processor 2i-20 generates complex symbols by encoding and modulating a transmission bit stream. Further, when data is received, the baseband processor 2i-20 reconstructs a received bit stream by demodulating and decoding the baseband signal provided by the RF processor 2i-10. For example, according to an OFDM scheme, when data is transmitted, the baseband processor 2i-20 generates complex symbols by encoding and modulating a transmission bit stream, maps the complex symbols to subcarriers, and then performs an inverse fast Fourier transform (IFFT) operation and a cyclic prefix (CP) insertion to configure OFDM symbols. Further, when data is received, the baseband processor 2i-20 divides the baseband signal provided by the RF processor 2i-10 in an OFDM symbol unit, reconstructs the signals mapped to the subcarriers by a fast Fourier transform (FFT) operation, and then reconstructs a received bit stream by the modulation and decoding.

The baseband processor 2i-20 and the RF processor 2i-10 transmit and receive a signal as described above. Therefore, the baseband processor 2i-20 and the RF processor 2i-10 may be referred to as a "transmitter," a "receiver," a "transceiver," or a "communication unit." Also, at least one of the baseband processor 2i-20 and the RF processor 2i-10 may include multiple communication modules in order to support multiple different radio access technologies. Further, at least one of the baseband processor 2i-20 and the RF processor 2i-10 may include different communication modules in order to process signals in different frequency bands. For example, the different radio access technologies may include a wireless LAN (e.g., IEEE 802.11), a cellular network (e.g., LTE), and the like. The different frequency bands may include a super high frequency (SHF) (e.g., 2.5 GHz and 5 GHz) band and a millimeter wave (e.g., 60 GHz) band.

The storage unit 2i-30 stores data such as basic programs, application programs, and configuration information for an operation of the terminal. In particular, the storage unit 2i-30 may store information related to a second access node configured to perform wireless communication by using second radio access technology. Also, the storage unit 2i-30 provides the stored data in response to a request of the controller 2i-40.

The controller 2i-40 controls overall operations of the terminal. For example, the controller 2i-40 transmits or receives a signal through the baseband processor 2i-20 and the RF processor 2i-10. Further, the controller 2i-40 records and reads data in to and out from the storage unit 2i-30. To this end, the controller 2i-40 may include at least one processor. For example, the controller 2i-40 may include a communication processor (CP) configured to perform a control for communication and an application processor (AP) configured to control a higher layer such as an application program.

Also, the controller 2*i*-40 may be configured to control to: receive system information related to cell reselection to a neighboring cell, from a base station on which the terminal is camping; if the terminal supports an SUL and first minimum requirement reception level information related to the SUL is provided through the system information, acquire a first cell selection reception level value based on the first minimum requirement reception level information related to the SUL; and perform cell reselection to an NR cell based on the first cell selection reception level value. Further, the controller 2*i*-40 may be configured to control to: if the terminal does not support an SUL, acquire a second cell selection reception level value based on second minimum requirement reception level information of the system information; and perform cell reselection based on the second cell selection reception level value. If the base station is an LTE base station, the system information may be related to inter-RAT cell reselection, and the first minimum requirement reception level information related to the SUL may be used for the inter-RAT cell reselection to the NR cell. If the base station is an NR base station and the neighboring cell is related to intra-frequency cell reselection, the system information including the first minimum requirement reception level information related to the SUL may correspond to system information block (SIB) 2 (SIB 2). If the base station is the NR base station and the neighboring cell is related to inter-frequency cell reselection, the system information including the first minimum requirement reception level information related to the SUL may correspond to SIB 4. The system information may include minimum requirement reception level information for each neighboring cell supporting the SUL.

Figure 2J:
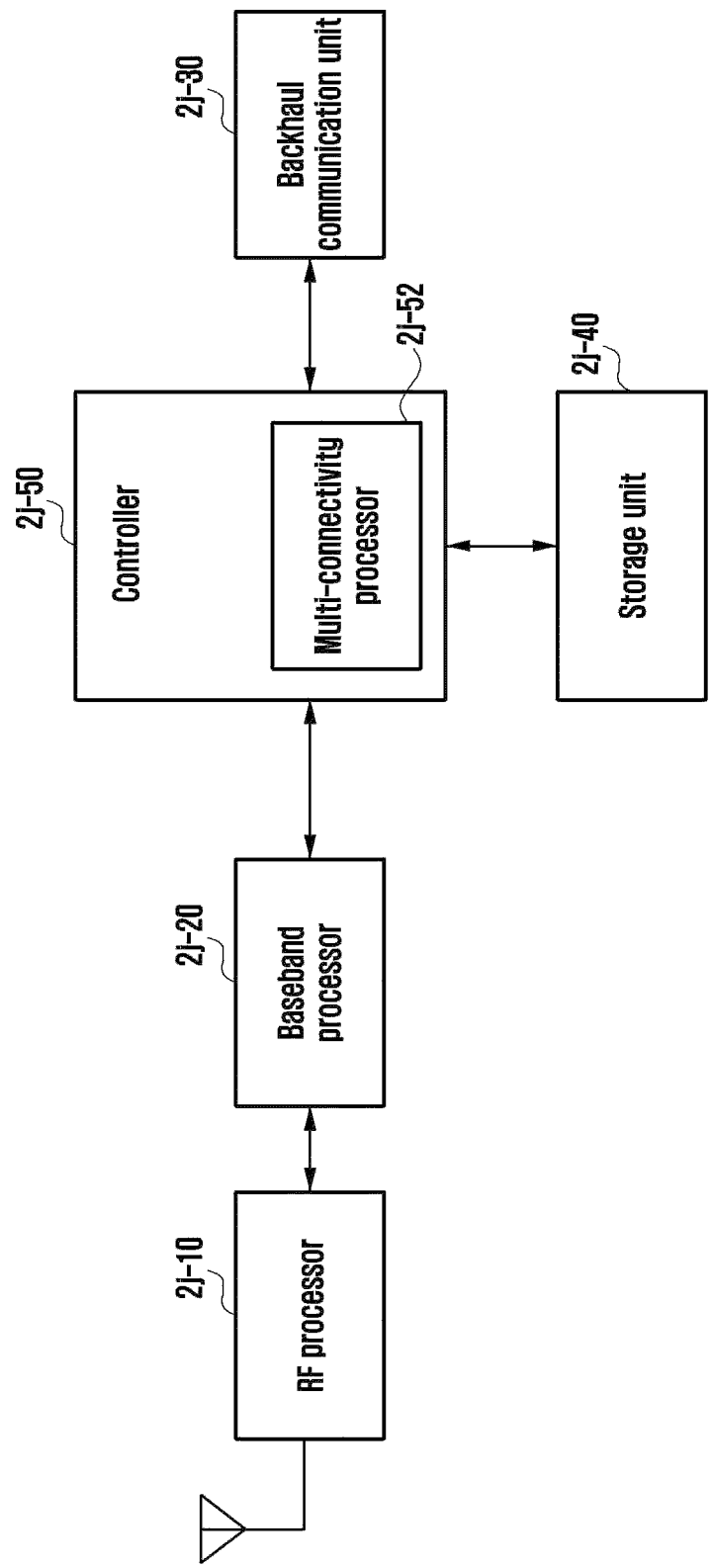
FIG. 2J is a block diagram illustrating a configuration of a base station according to an embodiment of the disclosure.

FIG. 2J is a block diagram illustrating a configuration of a base station according to an embodiment of the disclosure.

Referring to FIG. 2J, the base station includes an RF processor 2*j*-10, a baseband processor 2*j*-20, a backhaul communication unit 2*j*-30, a storage unit 2*j*-40, and a controller 2*j*-50. The controller 2*j*-50 may further include a multi-connectivity processor 2*j*-52.

The RF processor 2*j*-10 serves to transmit or receive a signal through a wireless channel, such as band conversion and amplification of a signal. That is, the RF processor 2*j*-10 up-converts a baseband signal provided by the baseband processor 2*j*-20 into an RF band signal and then transmits the RF band signal through an antenna and down-converts an RF band signal received through the antenna into a baseband signal. For example, the RF processor 2*j*-10 may include a transmission filter, a reception filter, an amplifier, a mixer, an oscillator, a DAC, an ADC, or the like. FIG. 2J illustrates only one antenna but the first access node may be provided with multiple antennas. Also, the RF processor 2*j*-10 may include multiple RF chains. Further, the RF processor 2*j*-10 may perform beamforming. For the beamforming, the RF processor 2*j*-10 may adjust a phase and a magnitude of each of the signals transmitted or received through multiple antennas or antenna elements. The RF processor 2*j*-10 may be configured to transmit one or more layers for a downlink MIMO operation.

The baseband processor 2*j*-20 performs a conversion function between a baseband signal and a bit stream according to a physical layer standard of first radio access technology. For example, when data is transmitted, the baseband processor 2*j*-20 generates complex symbols by encoding and modulating a transmission bit stream. Further, when data is received, the baseband processor 2*j*-20 reconstructs a received bit stream by demodulating and decoding the baseband signal provided by the RF processor 2*j*-10. For example, according to an OFDM scheme, when data is transmitted, the baseband processor 2*j*-20 generates complex symbols by encoding and modulating a transmission bit stream, maps the complex symbols to subcarriers, and then performs an IFFT operation and a CP insertion to configure OFDM symbols. Further, when data is received, the baseband processor 2*j*-20 divides the baseband signal provided by the RF processor 2*j*-10 in an OFDM symbol unit, reconstructs the signals mapped to the subcarriers by a fast Fourier transform (FFT) operation, and then reconstructs a received bit stream by the modulation and decoding. The baseband processor 2*j*-20 and the RF processor 2*j*-10 transmit and receive signals as described above. Accordingly, the baseband processor 2*j*-20 and the RF processor 2*j*-10 may be referred to as a "transmitter," a "receiver," a "transceiver," a "communication unit," or a "wireless communication unit."

The backhaul communication unit 2*j*-30 provides an interface for communication with other nodes in a network. That is, the backhaul communication unit 2*j*-30 converts a bit stream to be transmitted from the primary base station to another node, for example, an auxiliary base station and a core network, into a physical signal and converts a physical signal received from another node to a bit stream.

The storage unit 2*j*-40 stores data such as basic programs, application programs, and configuration information for an operation of the primary base station. In particular, the storage unit 2*j*-40 may store information on the bearers allocated to accessed terminals, measurement results reported by the accessed terminals, and the like. Also, the storage unit 2*j*-40 may store the information which becomes a standard of determination of whether to provide or stop providing multi-connectivity to a terminal. Further, the storage unit 2*j*-40 provides the stored data according to a request of the controller 2*j*-50.

The controller 2*j*-50 controls overall operations of the primary base station. For example, the controller 2*j*-50 transmits or receives a signal through the baseband processor 2*j*-20 and the RF processor 2*j*-10, or through the backhaul communication unit 2*j*-30. Further, the controller 2*j*-50 records and reads data in and from the storage unit 2*j*-40. To this end, the controller 2*j*-50 may include at least one processor.

The controller 2*j*-50 may be configured to control to: identify a neighboring NR cell supporting an SUL; generate system information related to cell reselection to the neighboring NR cell supporting the SUL; and transmit the system information. If the terminal having received the system information supports the SUL, a first cell selection reception level value of first minimum requirement reception level information related to the SUL included in the system information may be acquired, and cell reselection may be performed based on the first cell selection reception level value. If the terminal does not support the SUL, a second cell selection reception level value may be acquired based on second minimum requirement reception level information of the system information, and cell reselection may be performed based on the second cell selection reception level value. If the base station is an LTE base station, the system information may be related to inter-RAT cell reselection, and the first minimum requirement reception level information related to the SUL may be used for the inter-RAT cell reselection to the NR cell. If the base station is an NR base station and the neighboring cell is related to intra-frequency cell reselection, the system information including the first minimum requirement reception level information related to the SUL may correspond to SIB 2. If the base station is an NR base station and the neighboring cell is related to inter-frequency cell reselection, the system information including the first minimum requirement reception level information related to the SUL may correspond to SIB 4. The system information may include minimum requirement reception level information for each neighboring cell supporting the SUL.

The embodiments shown and described in the specification and the accompanying drawings are provided merely to easily describe the contents of the disclosure and help the understanding of the disclosure, and are not intended to limit the scope of the disclosure. Therefore, it should be construed that, in addition to the embodiments disclosed herein, all modifications and changes or modified and changed forms based on the technical idea of the disclosure fall within the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    in case that the terminal does not obtain valid system information related to cell reselection for a new radio (NR) neighboring cell, transmitting, to a base station, a request message for the system information related to the cell reselection for the NR neighboring cell;
    receiving, from the base station, the system information related to the cell reselection for the NR neighboring cell; the system information including second minimum required reception level information of the NR neighboring cell;
    in case that the terminal supports a supplementary uplink (SUL) and the system information includes first minimum required reception level information for the SUL of the NR neighboring cell, performing the cell reselection using a first cell selection reception level value identified based on the first minimum required reception level information;
    in case that the terminal supports the SUL and the system information does not include the first minimum required reception level information for the SUL of the NR neighboring cell, performing the cell reselection using a second cell selection reception level value identified based on the second minimum required reception level information; and
    in case that the terminal does not support the SUL, performing the cell reselection using the second cell selection reception level value identified based on the second minimum required reception level information.

2. The method of claim 1,
    wherein, in case that the base station corresponds to a long-term evolution (LTE) base station, the system information is related to inter-radio access technology (inter-RAT) cell reselection, and
    wherein the first minimum required reception level information related to the SUL is used for inter-RAT cell reselection to an NR cell.

3. The method of claim 1, wherein:
    in case that the base station corresponds to an NR base station and the NR neighboring cell is related to an intra-frequency cell reselection, the system information corresponds to a system information block 2 (SIB 2); and
    in case that the base station corresponds to the NR base station and the NR neighboring cell is related to an inter-frequency cell reselection, the system information corresponds to an SIB 4.

4. The method of claim 1, wherein the system information comprises a plurality of first minimum required reception level information for the SUL of each NR neighboring cell, in case that each NR neighboring cell supports the SUL, and
    wherein a plurality of second minimum required reception level information for each NR neighboring cell without considering whether each NR neighboring cells supports the SUL.

5. A terminal in a wireless communication system, the terminal comprising
    a transceiver; and
    a controller configured to:
    in case that the terminal does not obtain valid system information related to cell reselection for a new radio (NR) neighboring cell, transmit, to a base station via the transceiver, a request message for the system information related to the cell reselection for the NR neighboring cell,
    receive, from the base station via the transceiver, the system information related to the cell reselection for the NR neighboring cell, the system information including second minimum required reception level information of the NR neighboring cell,
    in case that the terminal supports a supplementary uplink (SUL) and the system information includes first minimum required reception level information for the SUL of the NR neighboring cell, perform the cell reselection using a first cell selection reception level value identified based on the first minimum required reception level information,
    in case that the terminal supports the SUL and the system information does not include the first minimum required reception level information for the SUL of the NR neighboring cell, perform the cell reselection using a second cell selection reception level value identified based on the second minimum required reception level information, and
    in case that the terminal does not support the SUL, perform the cell reselection using the second cell selection reception level value identified based on the second minimum required reception level information.

6. The terminal of claim 5,
    wherein, in case that the base station corresponds to a long-term evolution (LTE) base station, the system information is related to an inter-radio access technology (inter-RAT) cell reselection, and
    wherein the first minimum required reception level information related to the SUL is used for inter-RAT cell reselection to an NR cell.

7. The terminal of claim 5, wherein:
    in case that the base station corresponds to an NR base station and the NR neighboring cell is related to an intra-frequency cell reselection, the system information corresponds to a system information block 2 (SIB 2); and
    in case that the base station corresponds to the NR base station and the NR neighboring cell is related to inter-frequency cell reselection, the system information corresponds to an SIB 4.

8. The terminal of claim 5, wherein the system information comprises a plurality of first minimum required reception level information for the SUL of each NR neighboring cell, in case that each NR neighboring cell supports the SUL, and
wherein a plurality of second minimum required reception level information for each NR neighboring cell without considering whether each NR neighboring cells supports the SUL.

9. A method performed by a base station in a wireless communication system, the method comprising:
in case that a terminal does not obtain valid system information related to cell reselection for a new radio (NR) neighboring cell, receiving, from the terminal, a request message for the system information related to the cell reselection for the NR neighboring cell;
generating the system information related to the cell reselection for the NR neighboring cell, the system information including second minimum required reception level information of the NR neighboring cell; and
transmitting the system information related to the cell reselection for the NR neighboring cell,
wherein, in case that the terminal supports a supplementary uplink (SUL) and the system information includes first minimum required reception level information for the SUL of the NR neighboring cell, the cell reselection is performed using a first cell selection reception level value identified based on the first minimum required reception level information,
wherein, in case that the terminal supports the SUL and the system information does not include the first minimum required reception level information for the SUL of the NR neighboring cell, perform the cell reselection using a second cell selection reception level value identified based on the second minimum required reception level information, and
wherein, in case that the terminal does not support the SUL, the cell reselection is performed using the second cell selection reception level value identified based on the second minimum required reception level information.

10. The method of claim 9,
wherein, in case that the base station corresponds to a long-term evolution (LTE) base station, the system information is related to an inter-radio access technology (inter-RAT) cell reselection, and
wherein the first minimum required reception level information related to the SUL is used for inter-RAT cell reselection to an NR cell.

11. The method of claim 9, wherein:
in case that the base station corresponds to an NR base station and the NR neighboring cell is related to an intra-frequency cell reselection, the system information corresponds to a system information block 2 (SIB 2); and
in case that the base station corresponds to the NR base station and the NR neighboring cell is related to an inter-frequency cell reselection, the system information corresponds to an SIB 4.

12. The method of claim 9, wherein the system information comprises a plurality of first minimum required reception level information for the SUL of each NR neighboring cell, in case that each NR neighboring cell supports the SUL, and
wherein a plurality of second minimum required reception level information for each NR neighboring cell without considering whether each NR neighboring cells supports the SUL.

13. A base station in a wireless communication system, the base station comprising:
a transceiver; and
a controller configured to:
in case that a terminal does not obtain valid system information related to cell reselection for a new radio (NR) neighboring cell, receive, from the terminal via the transceiver, a request message for the system information related to the cell reselection for the NR neighboring cell,
generate the system information related to the cell reselection for the NR neighboring cell, the system information including second minimum required reception level information of the NR neighboring cell, and
transmit, via the transceiver, the system information related to the cell reselection for the NR neighboring cell,
wherein, in case that a terminal supports a supplementary uplink (SUL) and the system information includes first minimum required reception level information for the SUL of the NR neighboring cell, the cell reselection is performed using a first cell selection reception level value identified based on the first minimum required reception level information,
wherein, in case that the terminal supports the SUL and the system information does not include the first minimum required reception level information for the SUL of the NR neighboring cell, perform the cell reselection using a second cell selection reception level value identified based on the second minimum required reception level information, and
wherein, in case that the terminal does not support the SUL, the cell reselection is performed using the second cell selection reception level value identified based on the second minimum required reception level information.

14. The base station of claim 13,
wherein, in case that the base station corresponds to a long-term evolution (LTE) base station, the system information is related to an inter-radio access technology (inter-RAT) cell reselection, and
wherein the first minimum required reception level information related to the SUL is used for inter-RAT cell reselection to an NR cell.

15. The base station of claim 13, wherein:
in case that the base station corresponds to an NR base station and the NR neighboring cell is related to an intra-frequency cell reselection, the system information corresponds to a system information block 2 (SIB 2); and
in case that the base station corresponds to the NR base station and the NR neighboring cell is related to inter-frequency cell reselection, the system information corresponds to an SIB 4.

16. The base station of claim 13, wherein the system information comprises a plurality of first minimum required reception level information for the SUL of each NR neighboring cell, in case that each NR neighboring cell supports the SUL, and wherein a plurality of second minimum required reception level information for each NR neighboring cell without considering whether each NR neighboring cells supports the SUL.

* * * * *